United States Patent
Porter, Jr. et al.

(10) Patent No.: US 10,447,174 B1
(45) Date of Patent: Oct. 15, 2019

(54) ADDITIVE SYNTHESIS OF INTERLEAVED SWITCH MODE POWER STAGES FOR MINIMAL DELAY IN SET POINT TRACKING

(71) Applicant: Advanced Energy Industries, Inc., Fort Collins, CO (US)

(72) Inventors: Robert M. Porter, Jr., Fort Collins, CO (US); John Dorrenbacher, Fort Collins, CO (US)

(73) Assignee: ADVANCED ENERGY INDUSTRIES, INC., Fort Collins, CO (US)

( * ) Notice: Subject to any disclaimer, the term of this patent is extended or adjusted under 35 U.S.C. 154(b) by 0 days.

(21) Appl. No.: 16/405,251

(22) Filed: May 7, 2019

Related U.S. Application Data

(60) Provisional application No. 62/767,421, filed on Nov. 14, 2018.

(51) Int. Cl.
 *H02M 7/497* (2007.01)
 *H02M 1/42* (2007.01)
 *H02M 3/335* (2006.01)

(52) U.S. Cl.
 CPC ......... *H02M 7/497* (2013.01); *H02M 1/4208* (2013.01); *H02M 3/33507* (2013.01)

(58) Field of Classification Search
 CPC . H02M 1/12; H02M 7/501; H02M 2001/0077
 See application file for complete search history.

(56) References Cited

U.S. PATENT DOCUMENTS

| | | | | |
|---|---|---|---|---|
| 3,304,484 A | * | 2/1967 | Kernick | H02M 1/06 327/215 |
| RE28,986 E | * | 9/1976 | Heinrich | H02M 1/06 363/2 |
| 4,843,534 A | * | 6/1989 | Taddeo | H02M 7/497 363/134 |
| 6,236,580 B1 | | 5/2001 | Aiello et al. | |

(Continued)

FOREIGN PATENT DOCUMENTS

WO     2013107782 A2    7/2013

OTHER PUBLICATIONS

Tajeddine, Khalili et al., "A Cascaded H-Bridge Multilevel Inverter With Soc Battery Balancing", "International Journal of Advanced Computer Science and Applications", 2017, pp. 345-350, vol. 8, No. 12, Publisher: www.ijacsa.thesai.org.

(Continued)

*Primary Examiner* — Yusef A Ahmed
(74) *Attorney, Agent, or Firm* — Neugeboren O'Dowd PC

(57) ABSTRACT

An apparatus utilizing additive interleaved switchmode (PWM) power conversion stages, having minimal or no output filter, to achieve high bandwidth or even ideally instantaneous power conversion. The additive process may involve voltage stacking of isolated PWM converters, which are interleaved in time, or may involve a single input power supply and inductively combining output currents of PWM power converters interleaved in time, with either additive circuit having minimal or no output filtering. This circuit may overcome limitations for the frequency of feedback control loops once thought to be physical limitations, such as, fundamental switching frequency, output filter delay and the Nyquist criteria.

18 Claims, 24 Drawing Sheets

(56) References Cited

U.S. PATENT DOCUMENTS

| | | | |
|---|---|---|---|
| 6,545,450 B1 | 4/2003 | Ledenev | |
| 6,696,823 B2 | 2/2004 | Ledenev et al. | |
| 7,301,400 B1* | 11/2007 | Dening | H03F 1/0227 323/272 |
| 7,808,125 B1* | 10/2010 | Sachdeva | H02M 7/49 307/30 |
| 9,042,139 B1 | 5/2015 | Schultz | |
| 9,807,863 B1* | 10/2017 | Van Zyl | H03F 3/193 |
| 2004/0151010 A1* | 8/2004 | Jonsson | H02M 3/1584 363/65 |
| 2004/0223348 A1 | 11/2004 | West | |
| 2005/0093525 A1* | 5/2005 | Walters | H02M 3/1584 323/272 |
| 2005/0212497 A1 | 9/2005 | Cha | |
| 2006/0071649 A1 | 4/2006 | Schrom et al. | |
| 2006/0212138 A1* | 9/2006 | Zhang | G05B 19/0423 700/22 |
| 2007/0076452 A1* | 4/2007 | Schultz | H02J 3/1842 363/72 |
| 2007/0097571 A1 | 5/2007 | Dinh et al. | |
| 2008/0280175 A1* | 11/2008 | Gurunathan | H02M 1/14 429/405 |
| 2009/0066307 A1 | 3/2009 | Osterhout et al. | |
| 2010/0013307 A1* | 1/2010 | Heineman | G06F 1/26 307/33 |
| 2010/0207594 A1* | 8/2010 | Davoudi | H02M 3/157 323/283 |
| 2011/0012574 A1* | 1/2011 | Lish | H02M 3/1584 323/282 |
| 2011/0089928 A1* | 4/2011 | O'Gorman | H02M 3/157 323/318 |
| 2014/0015500 A1* | 1/2014 | Babazadeh | H02M 3/1584 323/272 |
| 2014/0036557 A1* | 2/2014 | Nondahl | H02M 1/12 363/71 |
| 2014/0312789 A1* | 10/2014 | Feng | H02M 3/33507 315/186 |
| 2015/0270789 A1 | 9/2015 | Shi et al. | |
| 2015/0326120 A1* | 11/2015 | Kelin | H02M 3/158 323/282 |
| 2016/0004266 A1* | 1/2016 | Mercer | G05F 1/575 323/280 |
| 2016/0329811 A1 | 11/2016 | Du et al. | |

OTHER PUBLICATIONS

Maxim Integrated Products, Inc., "DC-DC Converter Tutorial", Nov. 29, 2001, p. 5, Publisher: Retrieved from https://www.maximintegrated.com/en/app-notes/index.mvp/id/2031.

Bindra, Ashok, "The Advantages of Designing Multiphase, High-Power Buck Converters", Feb. 5, 2013, p. 2, Publisher: Retrieved from https://www.digikey.be/en/articles/techzone/2013/feb/the-advantages-of-designing-multiphase-highpower-buck-converters.

Hegarty, Tim, "Benefits of Multiphasing Buck Converters—Part 2", Nov. 24, 2007, p. 4, Publisher: Retrieved from https://www.eetimes.com/document.asp?doc_id=1273225#.

Schuellein, George, "Multiphase Buck Converter Design", Sep. 13, 2000, p. 8, Publisher: Retrieved from https://www.eetimes.com/document.asp?doc_id=1224753.

Fotouhi, R., Leitner, L., & Kennel, R., "An Efficient Method to Calculate Optimal Pulse Patterns for Medium Voltage Converters", "Industrial Electonics Society", Feb. 26, 2015, p. 6.

Cheng, Pengming et al., "Minimum Time Control for Multiphase Buck Converter: Analysis and Application", "IEEE Transactions on Power Electronics", Apr. 4, 2013, pp. 958-967, vol. 29, No. 2, Publisher: IEEE, Published in: US.

Parisi, Carmen, "Multiphase Buck Design From Start to Finish (Part 1)", Apr. 2017, p. 19, Publisher: Texas Instruments Incorporated, Published in: US.

Xie, Manjing, "Power Tips: How to Use Nyquist Plots to Assess System Stability", Feb. 15, 2017, p. 3, Publisher: Retrieved from https://e2e.ti.com/blog_/b/powerhouse/archive/2017/02/15/power-tips-how-to-use-nyquist-plots-to-assess-system-stability.

Richtek Technology Corporation, "Buck Converter Selection Criteria", "Known to exist as early as Mar. 1, 2019", p. 9, Publisher: Retrieved from https://www.richtek.com/Design%20Support/Technical%20Document/AN033.

Sheehan, Robert; Diana, Louis, "Switch-Mode Power Converter Compensation Made Easy", "Power Supply Design Seminar 2016/17", Sep. 2016, p. 38, Publisher: Texas Instruments.

Visser, A.J., Enslin, J.H.R., & Mouton, H.T., "Transformerless Series Sag Compensation with a Cascaded Multilevel Inverter", "IEEE Transactions on Industrial Electonics", Aug. 1, 2002, pp. 824-831, vol. 49, No. 4.

Stack Exchange Inc., "Voltage Mode Control of a DC-DC Buck Converter", "Known to exist as early as Mar. 1, 2019", p. 2, Publisher: Retrieved from https://electronics.stackexchange.com/questions/209274/voltage-mode-control-of-a-dc-dc-buck-converter.

Wikipedia, "Buck Converter", "Known to exist as early as Mar. 1, 2019", p. 2, Publisher: Retrieved from https://en.wikipedia.org/wiki/Buck_converter.

Chapre, Yogita, "International Search Report and Written Opinion Regarding International Application No. PCT/US2019/031146", dated Aug. 1, 2019, Page(s) 11, Published in: AU.

Ertl, Hans et al., "A Novel Multi-Cell DC-AC Converter for Applications in Renewable Energy Systems", "43rd Int. Conf. on Power Conversions and Intelligent Motion", Jun. 19, 2001, Page(s) 8, Published in: DE.

Johnson, B. et al., "Photovoltaic AC Module Composed of a Very Large Number of Interleaved Inverters", "2011 Twenty-Sixth Annual IEEE Applied Power Electronics Conference and Exposition", Mar. 6, 2011, pp. 976-981, Publisher: IEEE, Published in: US.

* cited by examiner

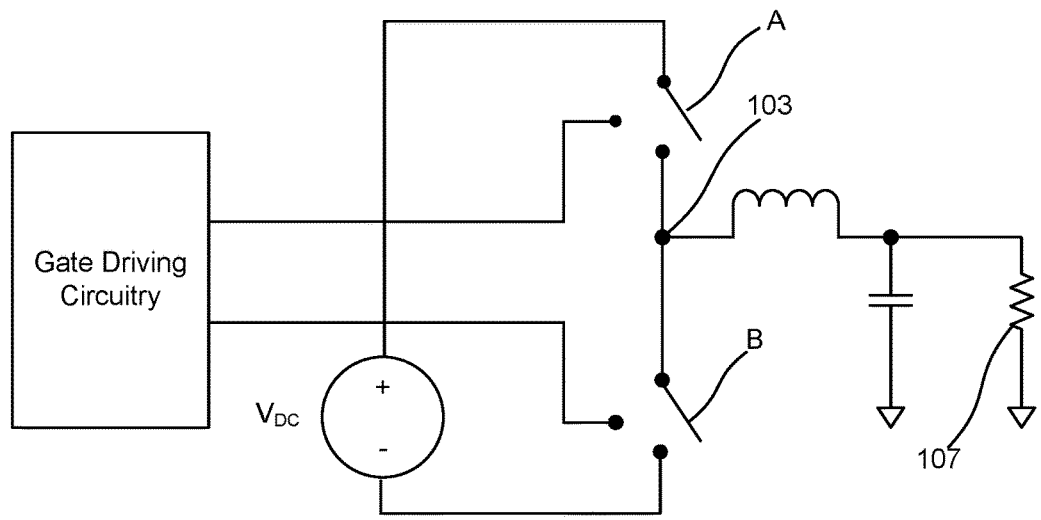
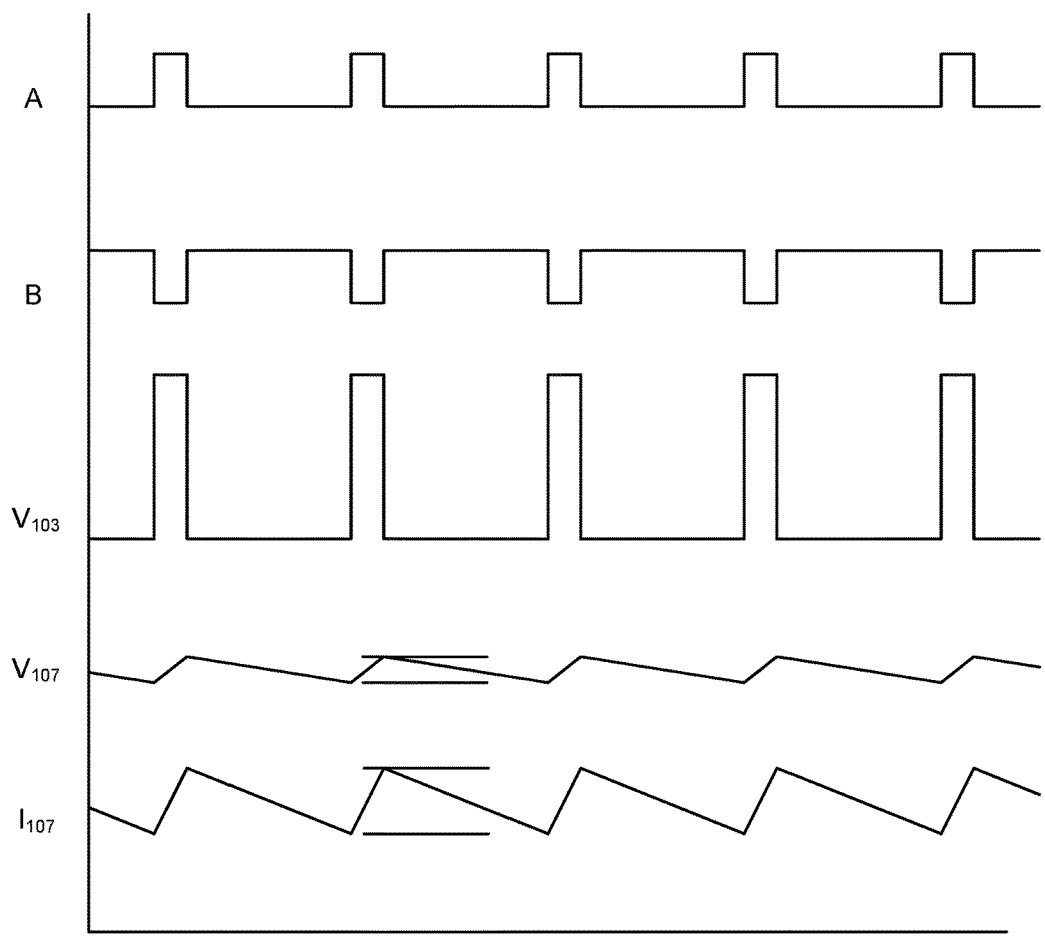
(PRIOR ART)
FIG. 1

US 10,447,174 B1

ADDITIVE SYNTHESIS OF INTERLEAVED SWITCH MODE POWER STAGES FOR MINIMAL DELAY IN SET POINT TRACKING

CLAIM OF PRIORITY UNDER 35 U.S.C. § 119

The present Application for Patent claims priority to Provisional Application No. 62/767,421 entitled "ARBITRARY WAVEFORM POWER GENERATOR" filed Nov. 14, 2018, and assigned to the assignee hereof and hereby expressly incorporated by reference herein.

FIELD OF THE DISCLOSURE

The present disclosure relates generally to power conversion. In particular, but not by way of limitation, the present disclosure relates to systems, methods and apparatuses for arbitrary waveform power generation.

DESCRIPTION OF RELATED ART

Switching power converters, or switchmode power converters, using pairs of switches (e.g., metal-oxide semiconductor field-effect transistors (MOSFETS)) rose in popularity in the 1980s due to their efficiency in both up and down conversion of power. Switching power converters employ pulse-width modulated (PWM) control of switches along with LC filtering of a PWM output from the switches to generate an up or downconverted waveform that roughly mimics a setpoint, though with some "ripple" that typically requires filtering. When a switch in a switchmode power converter is "on" it has low resistance, and when "off" it has a low leakage current. Consequently, the switches in a switchmode power converter are close to ideal and power dissipation is minimized. FIG. 1 illustrates one example of a switchmode buck (downconverting) converter. One can see that switches A and B switch at the same times, but in alternate opening/closing fashion such that current only passes through one switch at a time. The gate driving circuitry provides a higher duty cycle to switch B, resulting in the negative side of the DC supply spending more time coupled to the load 107 via output node 103 than the positive side, as can be seen via the voltage, $V_{103}$, taken at the output between the two switches. The result is an average delivered voltage across the load, $V_{107}$, that is less than one half of the voltage, $V_{DC}$, provided by the DC supply. By altering the duty cycle of the switches, the average delivered voltage, $V_{107}$, can be adjusted. One can also see that although a PWM voltage is provided by the switches, see $V_{103}$, this PWM voltage is filtered or smoothed by the illustrated LC filter producing a voltage, $V_{107}$, having significantly less ripple and more closely mimicking a setpoint of the gate driving circuitry, which in this example is a DC setpoint.

This example shows that ripple voltage has long-been considered an inevitable byproduct of switchmode power conversion, which more or less, digitizes an analog setpoint, and then attempts to convert that digital signal (the PWM voltage at output node 103) back to an analogue signal via the filter. To better recreate the setpoint waveform, larger filter components can be used, thereby further and further reducing ripple.

However, larger LC filter components are also slower to react to setpoint changes (i.e., they cause an increased response time of the converter). Thus, as one reduces ripple with larger LC components, one also adds delay between the setpoint and switchmode power converter's tracking of the setpoint. Higher voltages and currents also suggest the need for larger switches and larger LC components, thus further adding delay between the setpoint and the output's ability to rapidly track the setpoint.

Another way to reduce ripple is to increase switching frequency, which allows for a smaller LC filter to be used. Yet, power converters are limited to a maximum practical switching frequency due to switching losses, and thus the LC filter can only be reduced so far. The problem is further exaggerated in high power applications since larger switches are needed, thus further limiting the maximum switching frequency and leading to larger LC filters.

These and other methods are known by those skilled in the art to reduce ripple and decrease response time, yet practical limits on switching speed, switch size, LC component size, and ripple lead to practical limits for various use cases.

SUMMARY OF THE DISCLOSURE

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

One aspect of the present disclosure involves a power supply including a switch module comprising a first buck converter portion and a second buck converter portion, the first buck converter portion with a first output current magnetically coupled with a second output current of the second buck converter portion. The switch module may be an AWPG block as shown in FIG. 17. The power supply also includes a control module configured to generate a first sequence of pulses to the first buck converter and to generate a second sequence of pulses to the second buck converter, the first sequence of pulses interleaved in time with the second sequence of pulses (i.e., phase offset therefrom), the control module configured to generate the first sequence of pulses and the second sequence of pulses based on a target output waveform. The first buck converter portion generates a first portion of the target output waveform responsive to the first sequence of pulses and the second buck converter portion generates a second portion of the target output waveform responsive to the second sequence of pulses. The outputs of the first and second buck converter portions can be summed via the magnetic coupling between the outputs.

Another aspect of the present disclosure involves a power system, which may be for a plasma system, comprising a dynamic setpoint waveform generator comprising a controller providing a first sequence of pulses to a first switch pair and a second sequence of pulses to a second switch pair offset from the first sequence of pulses, the first sequence of pulses and the second sequence of pulses each based on a controllable set point (e.g., AC or modulating DC). The first switch pair may be coupled with a rail voltage, and comprise a first switch and a second switch interconnected at a common output operably connected with an input of a primary winding of a first transformer. An output of a secondary winding of the first transformer can be operably coupled with an output node. The second switch pair may be coupled with the same rail voltage, and the second switch pair can include a first switch and a second switch interconnected at a common output operably connected with an input of a primary winding of a second transformer. An input of a secondary winding of the second transformer can be coupled with an output of the primary winding of the first transformer, where an output of the secondary winding is operably coupled with the output node. Finally, the system may include a capacitor, or a filter, coupled with the common output, the capacitor or filter sized to allow a voltage at the common output to vary rapidly (e.g., fast enough to manage an arc response, e.g., <0.5 μs).

In yet another aspect, a power supply module may include a plurality of (N) buck converters each generating an output current magnetically coupled with an output of another one of the (N) buck converters, each buck converter switching at a fundamental frequency (f), wherein the magnetically coupled output of the (N) buck converters is responsive to an input set point at a frequency of N times the fundamental frequency to define an output waveform.

In another aspect, a power supply circuit is disclosed including a plurality of N, additive, interleaved, switchmode, power conversion stages, each having an output voltage and an output current. The circuit also includes a dynamic setpoint input to said power supply circuit. The circuit further includes an interconnect topology which connects said output voltage or output current from said interleaved, switchmode, power conversion stages into a summarized output responsive to the dynamic setpoint input. The summarized output responds instantaneously or approaches instantaneous response to changes in said dynamic setpoint input.

The interconnect topology for summarizing said interleaved, switchmode, power conversion stages may be accomplished with series connectivity by: powering each of the said interleaved, switchmode, power conversion stages from separate isolated input power supply rails; and connecting the outputs from each of said interleaved, switchmode, power conversion stage in series such that said output current from each stage is equal. The summarized output can be the sum of said output voltages of each of the said interleaved, switchmode, power conversion stages.

The process of summarizing said interleaved, switchmode, power conversion stages is accomplished in a parallel connectivity by: powering all of said N, additive, interleaved, switchmode, power conversion stages from a common input power supply rail, and, connecting the outputs from said interleaved, switchmode, power conversion stages to transformers configured to force the ac current from each of said interleaved, switchmode, power conversion stages to have the same ac current at all times, wherein said transformers are connected to provide a summarized output current which is the sum of the currents from each of said interleaved, switchmode, power conversion stages.

In another aspect of the disclosure, a power supply circuit is disclosed wherein each of a plurality of additive switchmode power conversion stages includes two switches, one coupled to a high voltage rail, and one coupled to a low voltage rail, and having a single pulse-width modulation output taken from between the two switches, the low voltage rails of all but one of the plurality of additive switchmode power conversion stages coupled to outputs of others of the plurality of additive switchmode power conversion stages, and a remaining low voltage rail providing the summarized output.

In yet another aspect of the disclosure, a power supply circuit is disclosed wherein each of a plurality of additive switchmode power conversion stages includes two switches, one coupled to a high voltage rail, and one coupled to a low voltage rail, and having a single pulse-width modulation output taken from between the two switches, the single pulse-width modulation outputs added together via a system of interlinked transformers providing the summarized output. The interlinked transformers can force the AC current from each of said interleaved, switchmode, power conversion stages to have the same AC current at all times.

Yet another aspect of the disclosure can be described as a switchmode power converter having an input and an output, wherein, the output tracks the input instantaneously after only inherent component delays.

Some embodiments of the disclosure may be characterized as a method of providing varying DC power to a plasma load to carry out a plasma processing recipe, the method comprising: providing a plurality of N, additive PWM power conversion stages, each having an inherent delay and each having a pulse width modulated output; providing a reference waveform, $V_R$, to the power supply circuit; providing a dynamic setpoint input to the power supply circuit, wherein a ratio of a dynamic setpoint voltage, $V_S$, at the dynamic setpoint input, over a reference waveform, $V_R$, equals an input voltage ratio, $V_S/V_R$; providing an interconnect topology between the plurality of additive PWM power conversion stages, the topology summarizing output voltages or currents from the plurality of additive PWM power conversion stages into a summarized output, providing the summarized output to a load; and adjusting the dynamic setpoint voltage and causing the summarized output to track the dynamic setpoint voltage instantaneously within $V_{RI}$ of the input voltage ratio $V_S/V_R$. This method can further include providing a filter between the summarized voltage output and the plasma load, the filter having a capacitance<40 nF.

Some embodiments of the disclosure may be characterized as a flash power converter with an arbitrary output. The power supply circuit can include a plurality of N, additive, interleaved pulse-width modulated (PWM) power conversion stages, a setpoint input, and an interconnect topology between the plurality of additive interleaved PWM power conversion stages. The plurality of N, additive, interleaved pulse-width modulated (PWM) power conversion stages can each having an output and a switch within each stage. These switches can have a fundamental switching frequency, f. The setpoint input can be configured to receive a dynamic setpoint waveform. The interconnect topology can connect the outputs of the plurality of additive interleaved PWM power conversion stages into a summarized output. In this embodiment, the current output of each of the plurality of additive PWM power conversion stages is the same. The voltage at the summarized output is a sum of an output voltage from each of the plurality of additive interleaved PWM power conversion stages. The summarized output can be configured to respond to the dynamic setpoint waveform at a frequency greater than the fundamental switching frequency f to define an output waveform.

Other embodiments of the disclosure may also be characterized as a flash power converter with an arbitrary output. The flash power converter can include a plurality of N, additive pulse-width modulated (PWM) power conversion stages, a reference input to the flash power converter, a dynamic setpoint input to the flash power converter, an interconnect topology, and a summarized output. The plurality of N, additive (PWM) power conversion stages can have inherent component delays and can each have a pulse width modulated output. A ratio of the dynamic setpoint waveform, $V_S$, at the dynamic setpoint input divided by a peak-to-peak voltage of the reference waveform, $V_R$, equals an input voltage ratio, $V_S/V_R$. The interconnect topology can be arranged between the plurality of additive PWM power conversion stages. The interconnect topology can summarize output voltages or currents from the plurality of additive PWM power conversion stages into a summarized output voltage, $V_{OUT}$. The summarized output can have a ripple voltage, $V_{RI}$, where the ripple voltage, $V_{RI}$, is a full peak-to-peak output voltage range, $V_T$, divided by N. The summarized output voltage, $V_{OUT}$, can track the dynamic setpoint waveform, $V_S$, where the summarized output voltage, $V_{OUT}$, responds to said dynamic setpoint waveform, $V_S$, such that after the inherent component delays, the summarized output voltage, $V_{OUT}$, is instantaneously within the ripple voltage, $V_{RI}$, of the input voltage ratio, $V_S/V_R$, times the full output peak-to-peak voltage range, $V_T$, of the summarized output voltage, $V_{OUT}$.

BRIEF DESCRIPTION OF THE DRAWINGS

Various objects and advantages and a more complete understanding of the present disclosure are apparent and more readily appreciated by referring to the following detailed description and to the appended claims when taken in conjunction with the accompanying drawings:

FIG. 1 illustrates one example of a switchmode buck (downconverting) converter;

DETAILED DESCRIPTION

Figure 2:
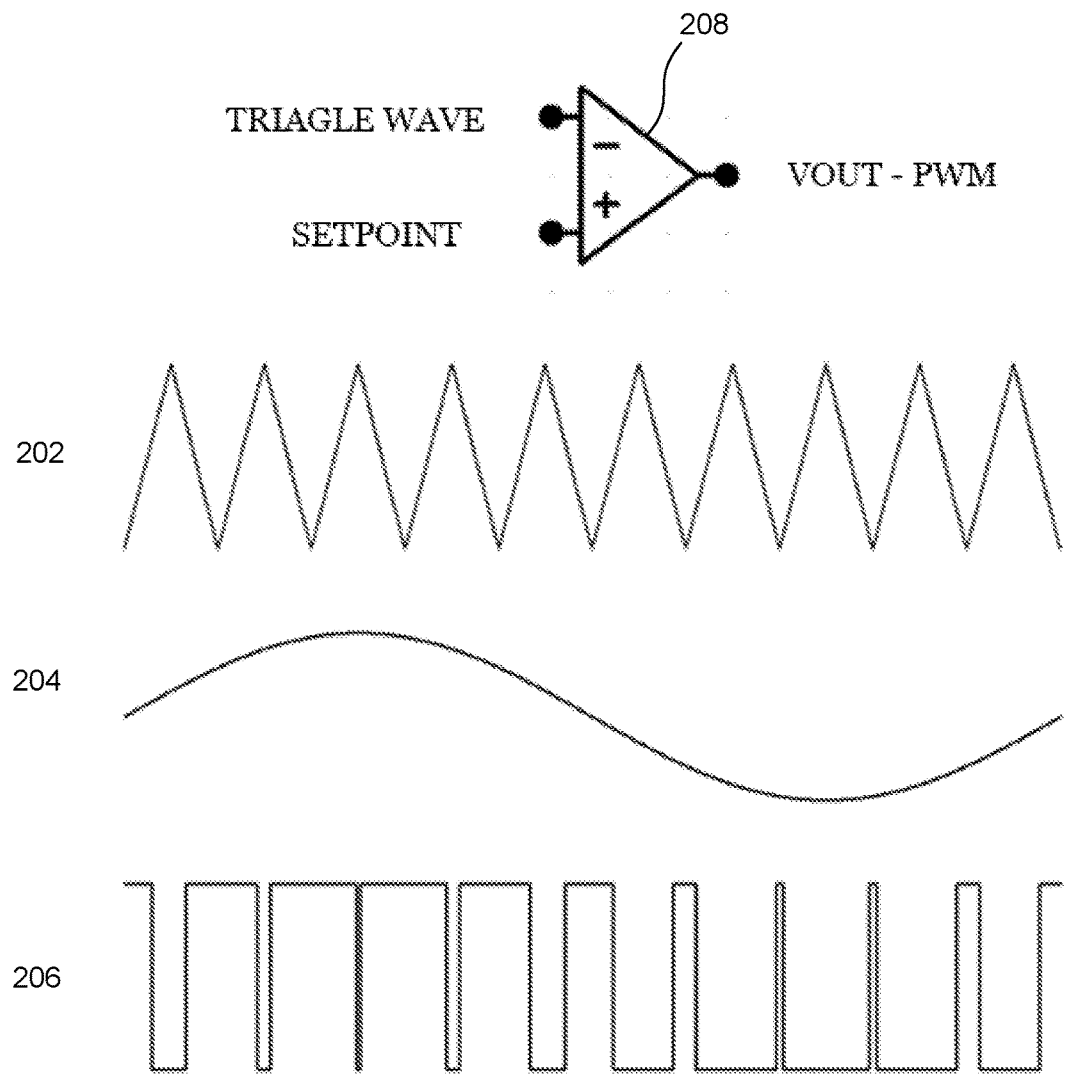
FIG. 2 illustrates an example of the comparison that occurs between the dynamic setpoint waveform and the reference waveform in the comparators.

The word "exemplary" is used herein to mean "serving as an example, instance, or illustration." Any embodiment described herein as "exemplary" is not necessarily to be construed as preferred or advantageous over other embodiments.

Preliminary note: the flowcharts and block diagrams in the following Figures illustrate the architecture, functionality, and operation of possible implementations of systems, methods and computer program products according to various embodiments of the present invention. In this regard, some blocks in these flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Overview of the Disclosure

Aspects of the present disclosure are directed to an N-phase flash interleaved bi-directional summarized power converter ("flash power converter") with a dynamic output, or the ability to track a dynamic setpoint with a faster response time than prior art converters (e.g., faster than a fundamental switching frequency, f, of the switches used to perform the switchmode power conversion, or faster than a limit set by the Nyquist criteria). The nature of the flash power converter rests on the inventors' recognition that a PWM output of each comparator in such a multi-phase power converter has a duty cycle that is ideally instantaneously responsive to a dynamic setpoint waveform. In one embodiment, the flash power converter can convert (increase or decrease) an amplitude of a dynamic setpoint waveform without delay (i.e., without delay beyond inherent device delays such as switching delays). In this sense, the present disclosure presents a flash power converter that "instantaneously" tracks a dynamic setpoint waveform, and can do so even where very high voltages and currents are needed (e.g., >500 V and >500 A).

Each of the N phases can include a dynamic setpoint waveform and a recurring reference waveform (e.g., a ramp or triangle wave or a sine wave to name a few non-limiting examples) (herein referred to as a "reference waveform"). The setpoints for each of the N comparators can be the same (just the dynamic setpoint waveform), but the reference waveforms are offset by N/360 degrees for each of the N comparators. So, for a 100 phase flash power converter, this would mean a 3.6 degree phase delay between comparators. Each comparator produces a single PWM output that is used to drive a switchmode power conversion stage of each phase. A high PWM output can turn the upper of a pair of switches on and a lower of the pair off, and a low PWM output can turn the upper switch off and the lower switch on. The N outputs of the N comparators can then be summarized into a summarized PWM output via series connections between the phases (e.g., see FIG. 4) or parallel connections between the phases (e.g., see FIG. 8). Each switchmode power conversion stage can be powered from an isolated power supply in the series variation, where driver circuitry manages the isolation. The result is a constant current output from each phase and a summed voltage output from all phases. For the parallel version, the output is a summation of currents from each of the N phases. A phase can be considered to include a half-bridge pair of switches (or a full-bridge set of switches), optionally a DC power supply or a portion of a DC power supply rail, optionally a driver, a comparator, and a phase delay component (for all but one of the phases).

While FIGS. 4 and 8 (discussed in detail below) show two embodiments of the disclosure, countless other circuits and topologies can also be implemented to achieve similar results (i.e., rapid output tracking of a dynamic setpoint). The common threads amongst these topologies are: (1) multiphasing: each power conversion phase includes a form of comparator circuit/device, a switchmode power conversion circuit, and a driver for the switchmode power conversion circuit; (2) interleaving: the reference waveform (e.g., a triangle wave) is interleaved or delayed between each of the N phases; (3) the ability to both source and sink power; and (4) summing: adding the voltage or current of each power conversion stage to form a summarized output.

Challenges Addressed

Typically, power converters passing high voltages and/or high currents use large output filters (i.e., large inductive and capacitive components) to smooth out ripple that is inherent in switchmode power converters. These large filters typically add significant delay to a conversion circuit's ability to quickly track a dynamic setpoint waveform (i.e., response time).

At the same time, high power switchmode power converters typically use large switches to handle high voltage and/or current, and these switches typically have a slower fundamental switching frequency (e.g., ~50 kHz to 400 kHz in plasma processing applications) than switches used in low voltage applications (e.g., power converters for microprocessors). What is more, it has long been held that the maximum unity gain crossover frequency of switchmode power supplies is limited by the Nyquist criteria—one half the fundamental switching frequency, f, of switches in the switchmode power supply (Kester, Walt. *What the Nyquist Criterion Means to Your Sampled Data System Design.* Analog Devices, MT-002). However, in practice, the usable switching frequency is even lower, due to changes in the load impedance, temperature, component variation, etc., and is often closer to f/4 or f/5.

As such, high power switch mode power converters worsen a problem seen in all power converters, even low powered ones; the output power lags behind changes in the setpoint—or fails to track the setpoint without noticeable delay. This disclosure drastically reduces that delay and approaches what one could call an "instantaneous" output response to changes in the power converter setpoint (or near-instantaneous tracking of a dynamic setpoint waveform). In other words, the herein disclosed flash power converter provides greatly improved response time over the prior art.

Such a power converter can be useful in plasma processing, where arcing commonly depresses fabrication yield. Arcs, like lightning in nature, actually grow in intensity over a short period of time (e.g., ~30 μs). Known plasma power supplies, for instance, the PINNACLE, AMS, DMS, and SMS AP, supplied by ADVANCED ENERGY of Fort Collins Colo., can reduce and even absorb power during an arcing event (e.g., see U.S. Pat. Nos. 8,217,299 and 8,552,665). However, these existing power supplies are limited in their ability to mitigate arcs due to the above-mentioned delays—the inability of a power converter's output to instantly react to changes to the setpoint, especially where high voltages and currents are used as is typical in plasma processing.

This disclosure's reduction, and near elimination, of delay between a change in the power supply circuit's setpoint and a resulting change in the output, greatly enhances the ability to reduce and even absorb power during an arcing event, as well as generate highly dynamic waveforms with near instantaneous response to setpoint. For instance, where prior art power converters imperfectly produce a square wave output (e.g., having beveled or 'soft' corners) or produce a slightly angled slope when there is a sharp voltage jump, the herein disclosed flash power converter produces much sharper square waves and nearly vertical jumps between voltages. This near instantaneous response to a dynamic setpoint waveform, even where high current and voltage are needed, have wide ranging applications in electric vehicle traction, powering an RF conversion stage, and reducing power supply size and stored energy, to name a few non-limiting examples.

Additionally, those in the plasma processing space have long sought to avoid or reduce the size of capacitors arranged between plasma power supplies and the plasma. Again, returning to the challenges of arcing, when an arc occurs, capacitors can dump their energy into the arc, thereby enhancing rather than reducing the arc. Thus, there has long been a desire to reduce the size of such capacitors—yet large ones have often been needed to smooth out ripple in a typical power converter output. The flash power converter herein disclosed achieves significant reduction in the ripple and thereby a significant if not complete elimination of the filtering capacitor. This in turn greatly reduces the need to design systems that mitigate the capacitor dumping power into arcs (e.g., in plasma processing applications).

On a similar note, power converters often also include feedback to help make small adjustments to the switching duty cycle to better achieve an output corresponding to the dynamic setpoint waveform. However, such feedback is also limited by the Nyquist criteria. Accordingly, feedback for power converters has an upper limit on the frequency of output sampling. This disclosure breaks this limitation and enables sampling frequencies above the Nyquist criteria, and even above the fundamental switching frequency, f, of the switches.

Definitions

In this disclosure, a reference waveform generally refers to a repetitive waveform, often a triangle, sawtooth, or ramp waveform. Other waveforms could also be implemented with known adjustment to the transfer function, including non-repetitive waveforms. The reference waveform may be a voltage, current, or combination of the two.

In this disclosure, a dynamic setpoint waveform generally refers to a signal representing a desired output of a power conversion circuit. The dynamic setpoint waveform may be modified by feedback or other factors, and can be repeating or non-repeating. The dynamic setpoint waveform may be a voltage, current, or combination of the two. The dynamic setpoint waveform can be sinusoidal, stepped, triangle, combinations of waveforms, complex profile waveforms, or any imaginable waveform at any frequency. This disclosure often uses a sinusoidal dynamic setpoint waveform to illustrate the effects of the flash power converter, but this is illustrative only, and the dynamic setpoint waveform is in no way limited to sinusoidal functions.

In this disclosure, an input voltage ratio, $V_S/V_R$, generally refers to a ratio of an amplitude of the dynamic setpoint waveform, $V_S$, over a peak-to-peak amplitude of the reference waveform, $V_R$. It should be noted that the input voltage ratio, $V_S/V_R$, is an instantaneous relationship of these two values.

In this disclosure, the output ratio generally refers to the value of the summed PWM output voltage or current at a point in time compared to the peak-to-peak voltage or current of the summarized PWM output voltage.

In this disclosure, inherent delay generally refers to signal delay attributed to comparators, drivers, and power conversion devices, such as switches and interconnects. It can include delays in drivers and power switches, but not delays caused by energy storage devices such as inductors, capacitors or filters. A driver circuit for a power conversion stage may have a latency or delay between the time an input changes and the time that an output changes. This delay could exist over a broad range depending on the power range or voltage isolation, for example. Common inherent delays for a switchmode power converter are 1-30 ns. A switch in the switchmode power converter may have a delay between when it receives a switching signal and when it actually becomes primarily conducting or primarily open. These transition times between open and closed and vice versa could be on the order of nanoseconds or microseconds.

Specific structures and control methods for achieving the above-mentioned advances will be described below.

Detailed Description of Structures and Methods for Implementation

In some embodiments of the disclosure, a flash power converter 306 is disclosed having a dynamic setpoint input, a reference waveform input, a driving portion, a serial switching and summation portion, and a summarized PWM output. The flash power converter 306 can receive a dynamic setpoint waveform from a setpoint waveform generator 304, and a reference waveform (e.g., a sawtooth function) from a reference generator 302, and output a summarized PWM output. The reference generator 302 may provide a sawtooth reference waveform as shown, for instance, in FIG. 2.

The reference generator 302 and the setpoint waveform generator 304 may form a part of an optional controller 301. The flash power converter 306 may also receive DC power from an optional DC power supply 312 or may include one or more internal DC supplies. The flash power converter 306 can compare the reference waveform and dynamic setpoint waveform, for instance via a series of phase offset comparators, to drive one or more switching sections, and sum the outputs thereof to form a summed pulse-width modulated (PWM) output that roughly mimics the dynamic setpoint waveform, but at a different voltage and/or current. This summed PWM output can then be provided to a load 310, where the summed PWM output is optionally smoothed via signal conditioning circuitry 308 such as an LC filter. However, in some cases the ripple may be sufficiently small to avoid the need for the signal conditioning circuitry 308. The optional DC power supply 312 may have a negative output, a ground, or may be a floating ground depending on the implementation. There is a characteristic of this simple circuit which is generally not known in the power conversion world: if the dynamic setpoint waveform changes, the output duty cycle changes instantaneously in response to the setpoint change.

Figure 4:
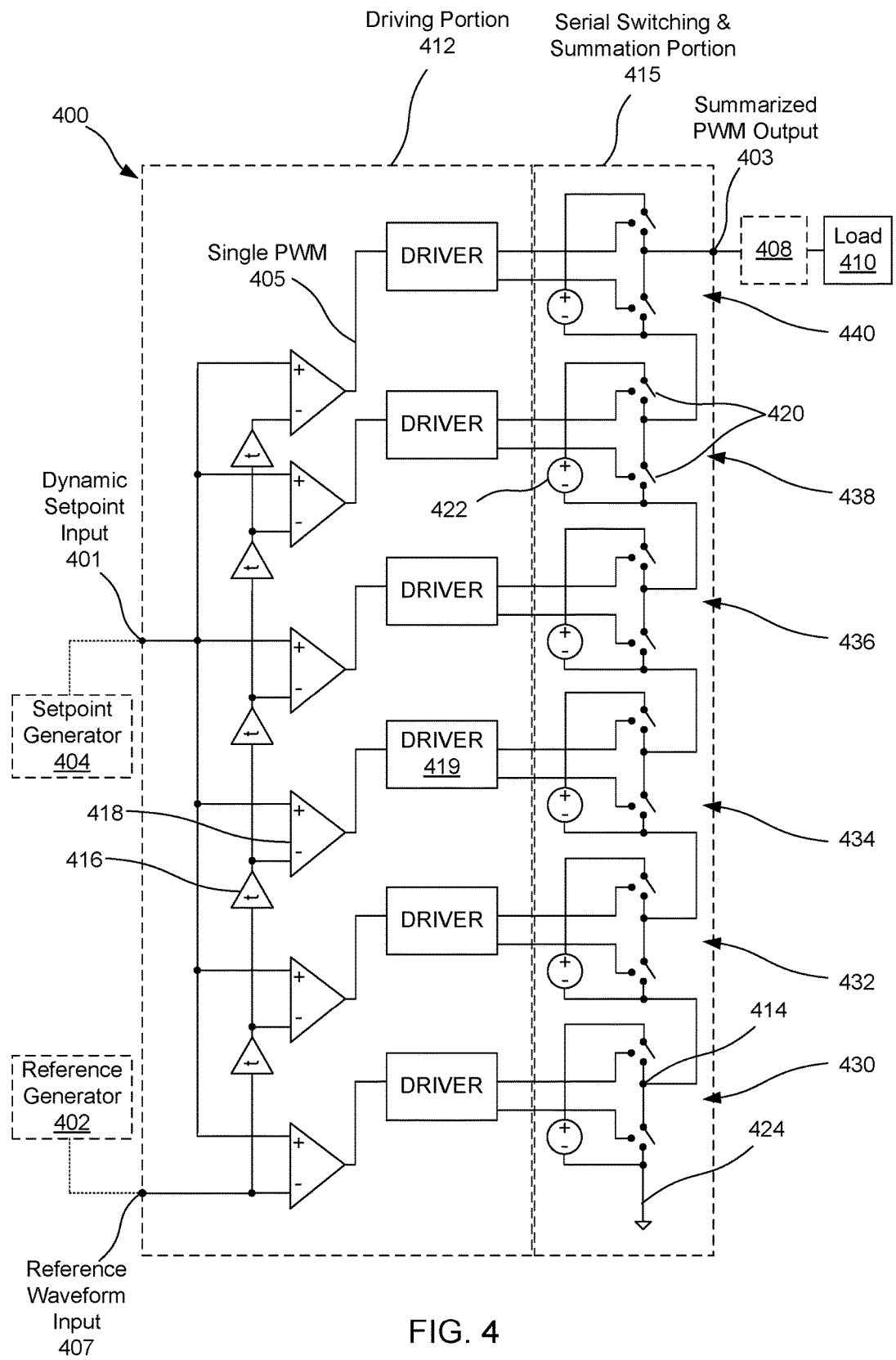
FIG. 4 illustrates an embodiment of a flash power converter with a serial summation topology.
Figure 5:
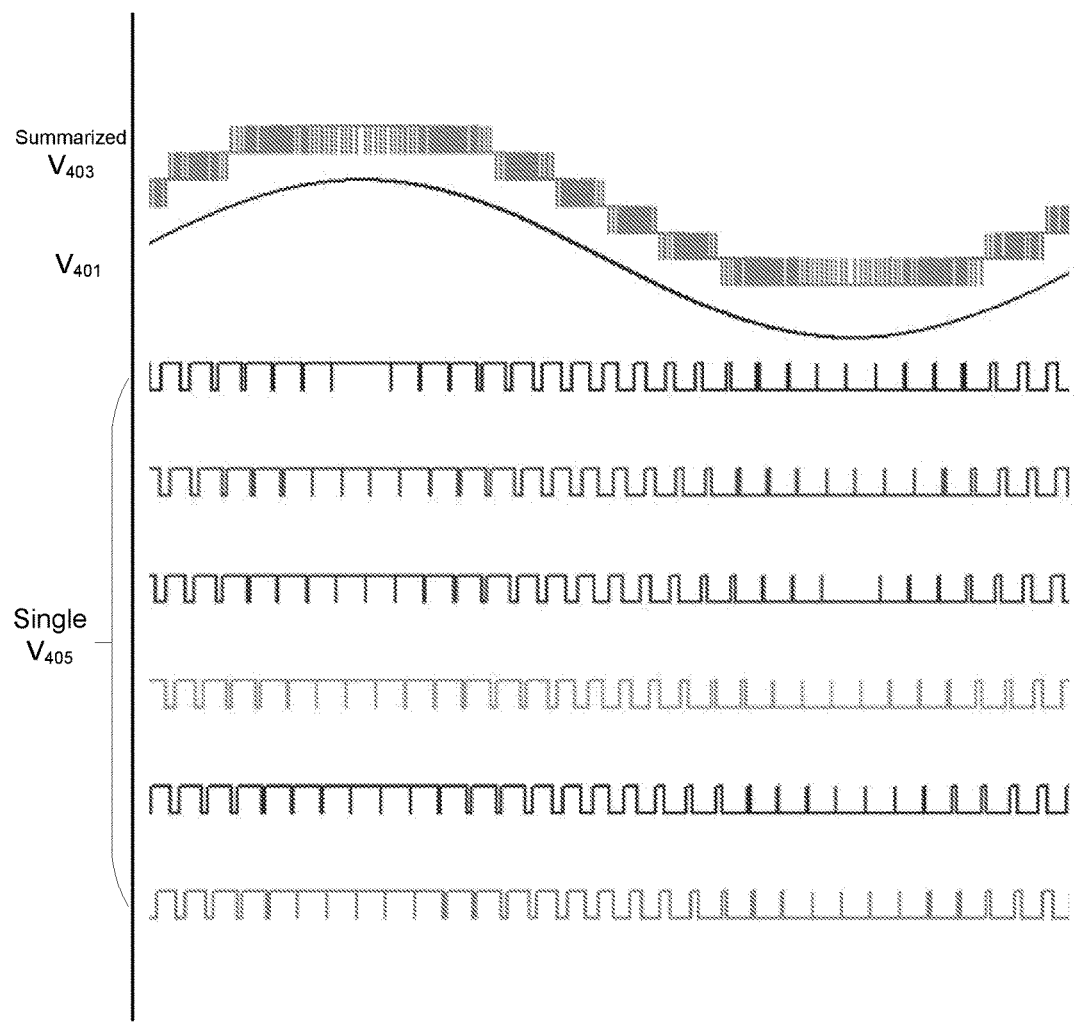
FIG. 5 illustrates one example of waveforms corresponding to the circuitry of FIG. 4.
Figure 6:
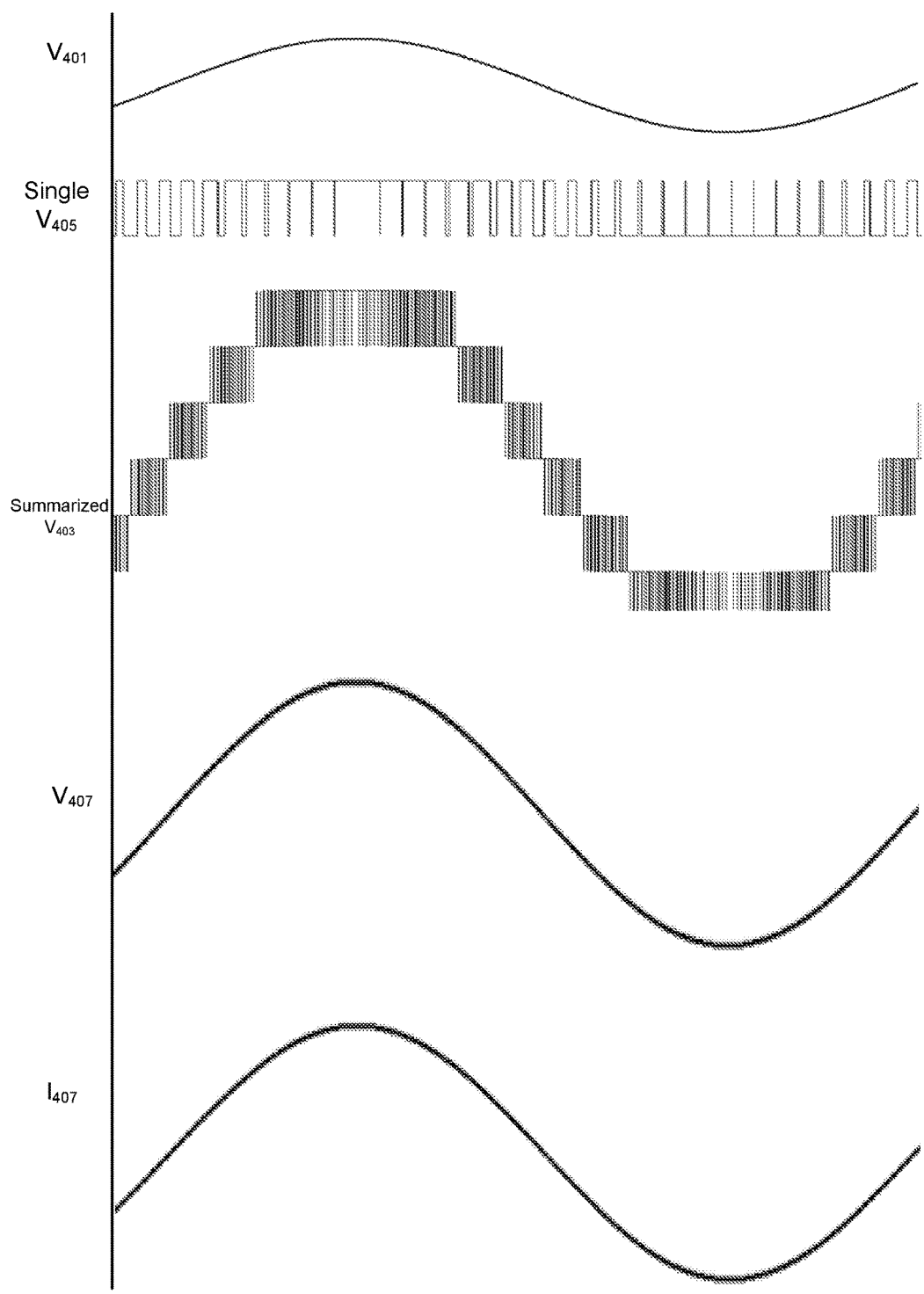
FIG. 6 illustrates another example of waveforms corresponding to the circuitry of FIG. 4.

A six-phase example of a "serial" variation of the flash power converter 306 is shown at least at FIG. 4 and associated waveforms at FIGS. 5-6. In some embodiments of the disclosure, a flash power converter is disclosed having a dynamic setpoint input, a reference input, a driving portion, a parallel switching portion, a parallel summation portion, and a summarized PWM output. A six-phase example of a "parallel" variation of the flash power converter 306 is shown at least at FIG. 8 and associated waveforms at FIGS. 10-14.

In both the series and parallel variations, the driving portion 412 translates the dynamic setpoint waveform, in association with the reference input, to a set of two or more pulse-width modulated (PWM) signals that are interleaved or phase offset from every other set. Each of the two or more PWM signals is provided to a different "phase" within either the serial switching and summation portion (e.g., FIG. 4) or the parallel switching portion (e.g., FIG. 8). The number of single PWM signals 405 equals the number of phases, N, and the phase offset between closest single PWM signals 405 is 1/N of the fundamental switching period. In the illustrated examples of FIGS. 4 and 8 there are six phases and thus six offset or interleaved single PWM signals.

Each phase can include a half-bridge (FIGS. 4 and 8) or full-bridge (FIGS. 15 and 16) switching section. The serial version can include a DC power supply (floating and isolated) for each phase, and the parallel version can include either a DC power supply for each phase or a pair of DC rails (floating or grounded) powering each phase. Each phase can also include a switching control signal input receiving PWM signals for each of the two or four switches. Each phase can also include a pulse-width modulated (PWM) output. The PWM output can have a swing voltage set by the DC power supply or rails.

The PWM output from each phase is summed with all other PWM outputs in either: (1) a serial fashion, where an output node between the switches in all but one phase is coupled to a low voltage side of a next DC power supply or a next low voltage rail and the remaining output node is the summarized PWM output; or (2) a parallel fashion, where an output node between the switches in all phases is passed to a separate but magnetically-coupled transformer of a parallel summation portion. In the latter case, each of these magnetically-coupled transformers includes (1) an input to a primary winding coupled to the PWM output of one of the phases, (2) an input of a secondary winding coupled to an output of a primary winding of another of the magnetically-coupled transformers, and (3) an output from the secondary winding coupled to all the other outputs of secondary windings to form the summarized PWM output.

In both variations, the summarized PWM output can be provided to a load and optionally passed through signal conditioning circuitry, such as a filter, before reaching the load.

The speed of the flash power converter's response to changes in the dynamic setpoint waveform may be a function of the number of phases, N. Specifically, the flash power converter's sampling frequency, or number of output voltages that can be achieved as a function of time, can be found as f*N, where f is the fundamental switching frequency of the switches used in each phase. So, for example, with 24 phases each running at f=200 kHz it is possible to adjust the summarized PWM output as fast as 24*200 kHz, or 4.8 MHz, where the prior art is limited to switching of 40 kHz. As seen, the improvement in response time to a dynamic setpoint waveform is profound.

While both the parallel and serial variations provide substantial advantages over the prior art, the parallel variation sees each phase output current being magnetically coupled to the current output of another phase. Each phase is connected to another such that output currents from all phases are the same. However, since a transformer is arranged between the switches and the load, only AC current is equalized between the phases. Any DC or low frequency AC current is blocked by the transformers, which can lead to DC or low frequency AC imbalances between the phases. Feedback may be needed to help balance the phases—added complexity and signal degradation that the serial version does not suffer from.

FIG. 4 illustrates an embodiment of a flash power converter with the above-noted serial summation topology. The reference waveform input 407 could be coupled to an optional reference generator 402 producing a reference waveform, such as a triangle or sawtooth waveform. The dynamic setpoint input 401 could be coupled to an optional setpoint waveform generator 404 producing an arbitrary waveform such as those used in complex plasma processing recipes or situations where instant and large changes in voltage and/or current are desired.

The dynamic setpoint input 401 and the reference waveform input 407 are each coupled to an N number of comparators 418 within the driving portion 412, where the comparators 418 are time-sequenced. In other words, a phase delay (e.g., 1/N) is applied to the reference waveform between each comparator 418, such that each comparator 418 sees a different phasing of the reference waveform (i.e., the PWM pulse trains reaching each set of switches is interleaved). So, for example, in a six phase implementation, as shown in FIGS. 4 and 8, the reference waveforms can be offset by 60 degrees (e.g., 360/6=360). The phase delay may be effected via a phase delay component 416 between each comparator 418, although any number of devices, circuits, and methods can be used to generate phase delays between the reference waveform reaching the comparators 418. The phase delay, t, can be equal to 1/N, or $\frac{1}{6}^{th}$, in this case, of the fundamental switching period. Each comparator 418 in turn generates an up or down (on or off) signal in response to the state of the dynamic setpoint waveform and the reference waveform at each moment in time (e.g., when the dynamic setpoint waveform is greater than the reference waveform, a comparator produces an up/on signal). Consequently, the output of each comparator is a PWM signal having a duty cycle representative of the dynamic setpoint waveform. Specifically, the PWM output of each comparator 418 has an instantaneous duty cycle (i.e., a duty cycle at a given moment in time, not over a period of time) that is equal to the input ratio—the value of the dynamic setpoint waveform at a moment in time over the peak-to-peak value of the reference waveform. For example, if the dynamic setpoint waveform is 2.4 V at a moment in time, and the reference waveform is 6.0 V, then the duty cycle of the comparator's PWM output at that moment in time is 40%. Assuming a dynamic setpoint, this duty cycle will be less than or greater than 40% at a next moment in time—even though the PWM pulse height may remain up or down for some time (until the two comparator inputs cross).

FIG. 2 illustrates an example of the comparison that occurs between the dynamic setpoint waveform and the reference waveform in the comparators 418. Namely, illustrated is a dynamic setpoint waveform 204, a reference waveform 202, and a resulting single PWM output 206 from a comparator 208 that takes these two signals as inputs. The comparators 418 each generate a single PWM output 405 having a duty cycle equal to a ratio of the dynamic setpoint waveform at a given time to a peak-to-peak value of the reference waveform at that same time.

While a single PWM output of a comparator with these inputs has been known, the inventors recognized that hidden in the single PWM output is the fact that at any moment the PWM output has a duty cycle that is equal to the input ratio—not just an up or down—but a greyscale value between and including one and zero that is equal to a ratio of the dynamic setpoint waveform over the reference waveform. Said another way, even where the PWM output appears to be a high or a low, and a given pulse appears to have a given duty cycle once the whole pulse has been plotted, in reality, the duty cycle may be changing throughout that pulse.

Figure 22:
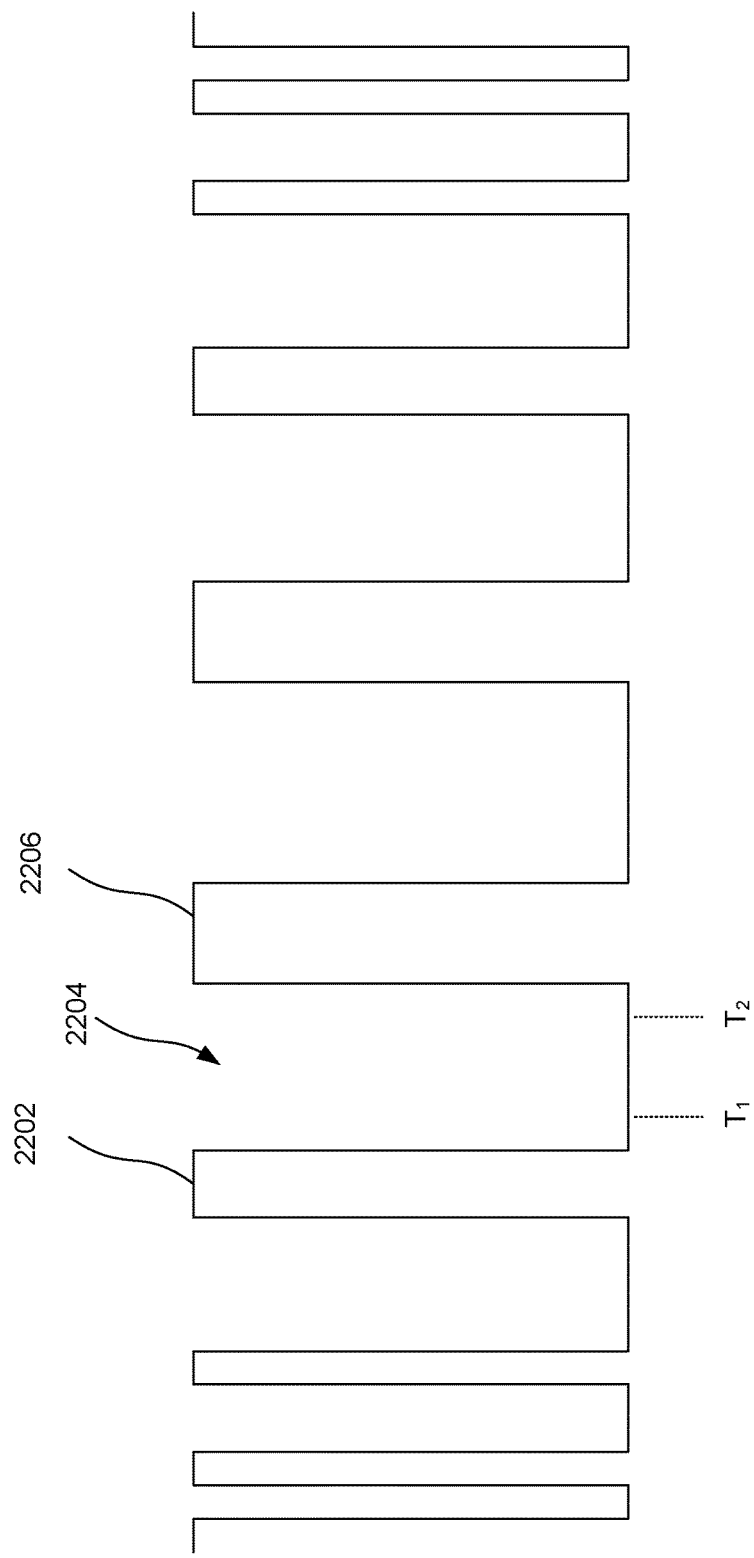
FIG. 22 illustrates an enlarged view a single PWM output from one of the comparators in FIG. 4 given a sinusoidal dynamic setpoint waveform.

This revolutionary discovery may be better understood with reference to FIG. 22, which shows an enlarged view a single PWM output from one of the comparators 418 in FIG. 4 given a sinusoidal dynamic setpoint waveform and a triangle reference waveform. One can see that the width of the pulses varies in time, and those in the art assumed that the duty cycle was a ratio of a pulse trough (e.g., 2204) over a pulse crest (e.g., 2202 or 2206). However, the inventors discovered that this is not so. In fact, the duty cycle through each crest and each trough is constantly varying. This means that the duty cycle at $T_1$ is different than the duty cycle at $T_2$ even though the amplitude of the PWM signal is not changing between these two points. One could say that this relationship between the input voltage ratio and the duty cycle of the PWM signal is "hidden" when just looking at a single comparator output. However, when this PWM output from a comparator is passed through a serial switching and summation portion (e.g., 415 in FIG. 4) or a parallel switching portion and a parallel summation portion (e.g., 815 and 817 in FIG. 8), comprising at least two phases, then the data hidden in each single PWM output (e.g., 405) begins to become observable and usable. In particular, while plot 206 in FIG. 2 shows a PWM output of a single comparator, $V_{403}$ in FIG. 6 shows that when two or more of these PWM outputs are summed, and assuming that the inputs to the comparators were interleaved or offset, the summed PWM output begins to resemble the dynamic setpoint waveform (e.g., $V_{401}$). When only a handful of phases are used (e.g., 2-5), significant ripple is visible, and filtering may still be desired for achieving a suitably stable output waveform. However, when a sufficient number of phases are summed, (e.g., >6) such as the 24 phases shown in FIGS. 12-14, the ripple amplitude approaches negligible and smaller filters can be used, and in some cases the ripple may be sufficiently small that a filter can be omitted.

Figure 13:
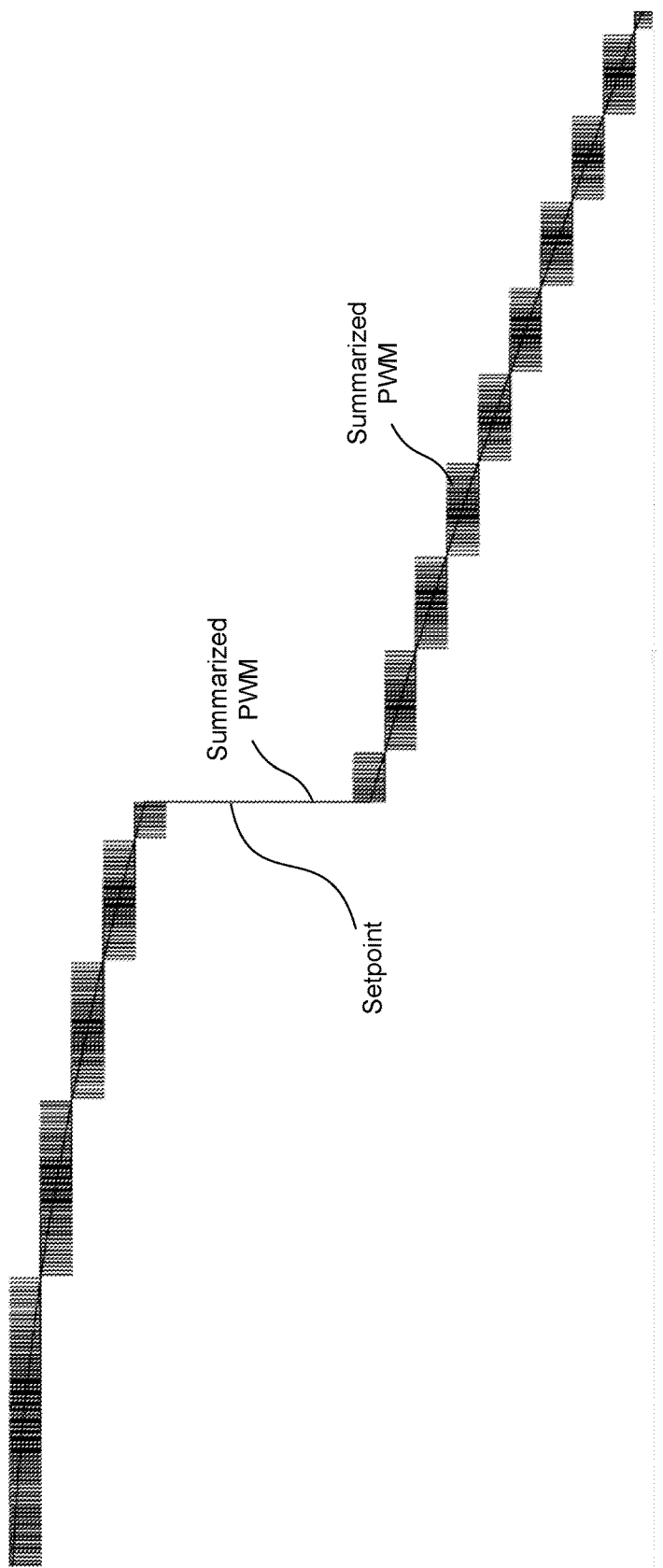
FIG. 13 shows an expanded view of FIG. 12 showing an instance where a sinusoidal dynamic setpoint waveform sees a vertical step between two values (i.e., no time delay), and the ability of the summarized PWM output to nearly-instantly track this voltage step.
Figure 14:
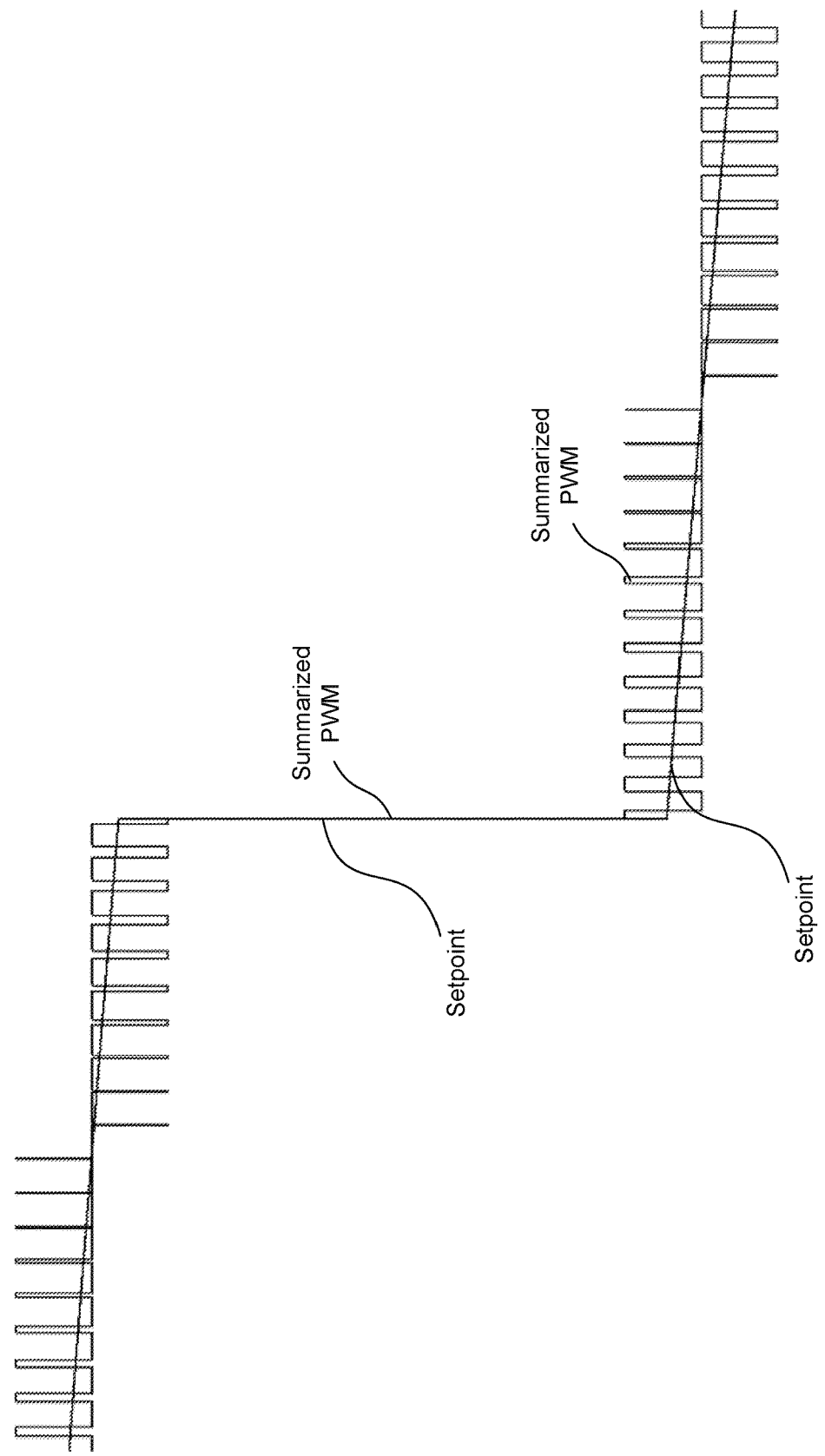
FIG. 14 shows a further expansion of the waveforms in FIG. 13.

FIGS. 13 and 14 also demonstrate the hidden data within the duty cycle of the single PWM output (e.g., 405). FIGS. 13 and 14 show two different views of the same portion of a dynamic setpoint waveform having a voltage step and the resulting summarized PWM output for a 24-phase flash power converter. In the expanded view of FIG. 14 one can see that before the dynamic setpoint waveform voltage step the summarized PWM output was in a low state. Also, based on the apparent duty cycle of the pulses prior to the voltage step, it would appear that the low signal would continue after the voltage step. Yet, when one focuses on the summarized PWM state at the bottom of the voltage step, where one would expect to continue seeing the low state of the summarized PWM, unexpectedly the summarized PWM state is instead high. This change in the dynamic setpoint waveform and the resulting switch in the summarized PWM output state helps to visualize the "hidden" data within the outputs from the comparators. This shows that the apparent duty cycle of the summarized PWM output at any instant is actually not the summarized PWM's duty cycle—there is some unseen instantaneous duty cycle at every moment. The voltage step "revealed" this hidden data by causing the summarized PWM output to flip states from one moment to the next. This example is in no way limiting of the disclosure, but merely meant to help visualize that there is hidden data in the PWM output from a comparator and further in the summarized PWM output that has an instantaneous value that is not equal to the visible duty cycle of the waveform.

The single PWM outputs 405 from each comparator, are each passed to a respective driver 419. The drivers 419 can take a logic level signal from a respective comparator 418 and boost them to a high current signal at a voltage suitable for driving high power switches (e.g., 420). In FIG. 4 the drivers 419 drive both the upper and lower switch of a phase. In particular, the drivers 419 translate the single PWM output 405 signals into two driving signals that are passed to pairs of switches 420 (or switch pairs) of each phase (or four driving signals that are passed to the switches 420 of each phase in a full-bridge configuration). For instance, each driver 419 may receive a low voltage PWM output 405 from a respective comparator 418 and output two higher voltage signals—high enough to drive the switches 420. In this circuit the drivers 419 also translate the drive across any isolation or voltage translation. In an embodiment, the drivers 419 often have internal level shifters and/or isolators. In an embodiment, a separate driver could be used for each low side and each high side switch. The drivers 419 may have an input section which shares a power supply with the respective comparator 418. The drivers 419 often have an isolation stage between the input circuitry and the power output stage because the high-power switches may have different power supply rails or these rails may be noisy as a result of being connected to high power switchmode circuitry. The switches for a given phase may share a power supply. In the case of FIG. 4, the isolated input of these drivers 419 may also be able to withstand additional voltage stress due to the series connection of the phases.

Figure 8:
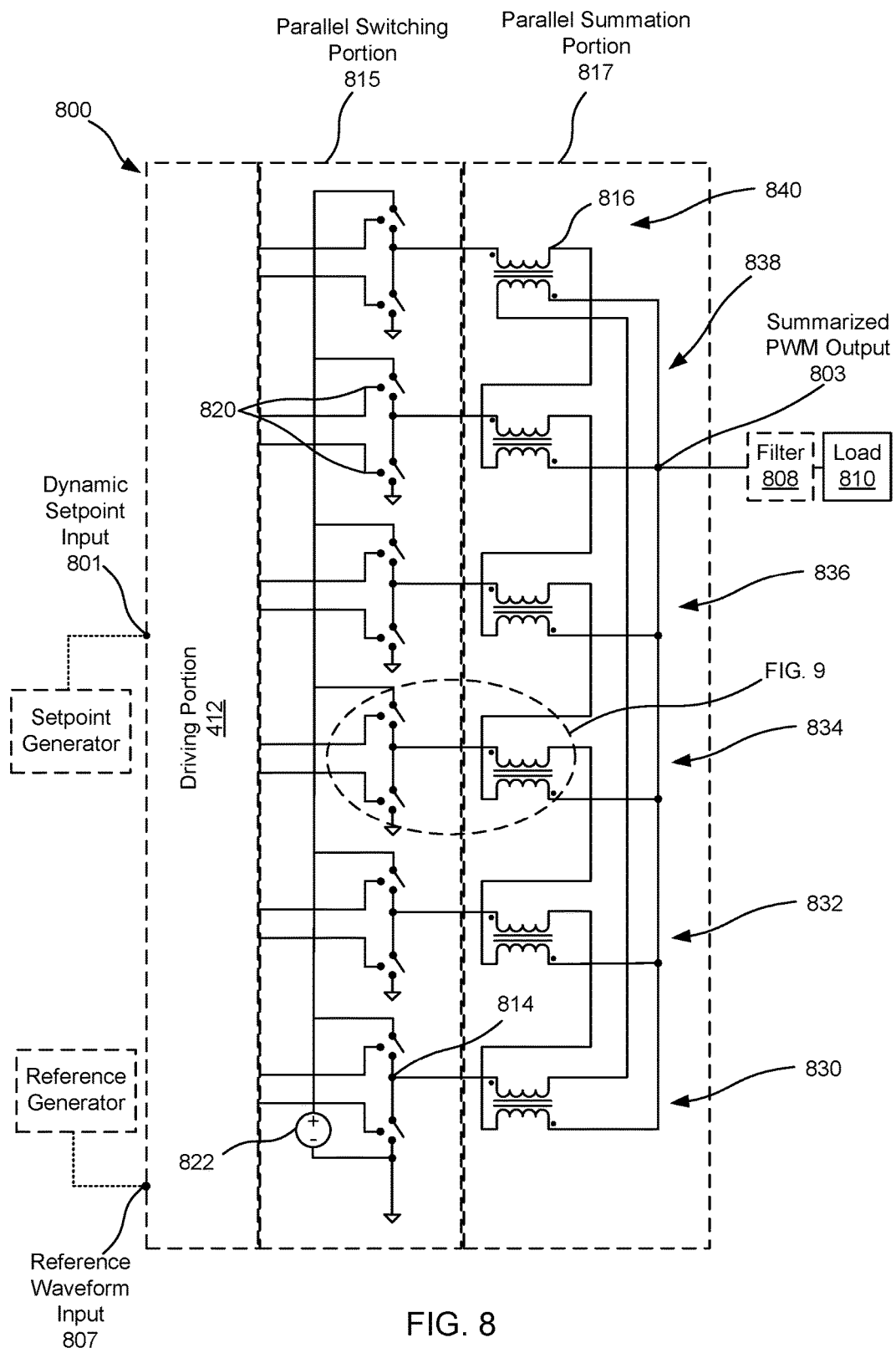
FIG. 8 illustrates an embodiment of a flash power converter with a parallel summation topology.
Figure 15:
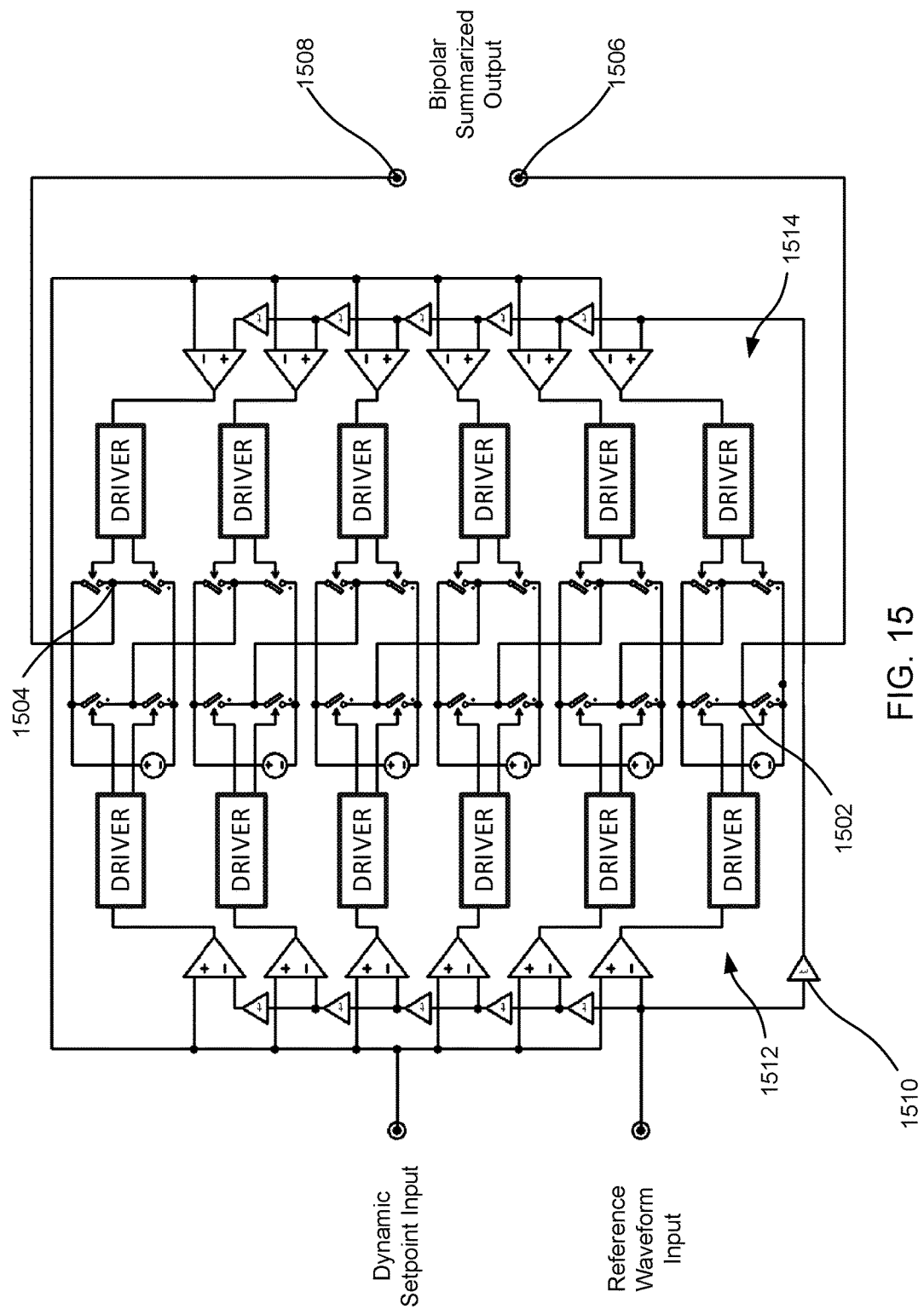
FIG. 15 illustrates an embodiment of a flash power converter that sums two sets of switching pairs in parallel to provide a bipolar output.
Figure 16:
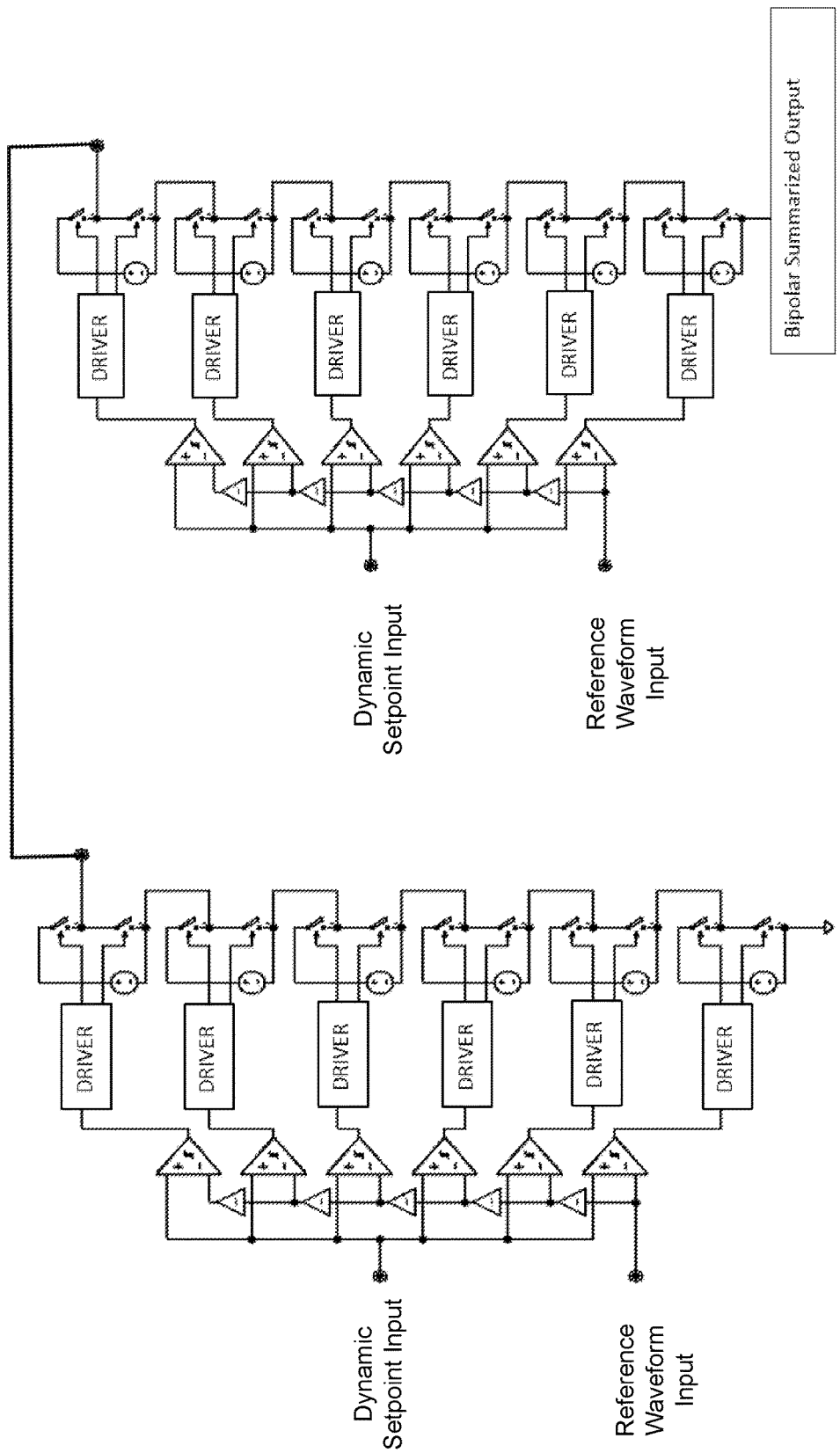
FIG. 16 illustrates another embodiment of a flash power converter that sums two sets of switching pairs in series to provide a bipolar output.

The switches 420 are shown in half-bridge configurations in FIGS. 4 and 8. However, they may also be arranged in full-bridge configurations as shown in FIGS. 15 and 16. In one example, the switches may each be a type of MOSFET but other types of switches are also possible such as Si FETs, SiC FETs, IGBTs, and bipolar to name a few. Each phase in FIG. 4 includes an output node 414, which is taken from between two corresponding switches 420 from the same phase. The outputs of the first through fifth phases 430-438 are connected in series, adding the voltages, such that the summarized PWM output 403 from the sixth phase 440 is a sum of the output voltages of all six phases. One of the two switches 420 in each phase couples the corresponding output node 414 to a high voltage from a DC power supply 422 in the on-state, and blocks the DC power supply in an off-state. The other switch in each phase couples a low voltage from the DC power supply 422 (or a low voltage rail) and the output node 414 of a previous phase to the output node 414 of this phase in the on-state, and blocks this connection in the off-state. However, the output node 414 of all but one of the phases is always coupled to the low voltage side of the next DC power supply 422. For example, if all the upper switches are on, then the summarized PWM output 403 would be six times the DC power supply 422 voltages. If all the lower switches are on, then the summarized PWM output 403 would be 0V. Most of the time, the summarized PWM output 403 is somewhere between these two extremes. In this illustration, the DC power supplies 422 are isolated and floating.

The first phase 430 includes a ground connection 424 to the lower of its two switches 420, and thus couples its output node 414 to ground 424 when the lower switch 420 of the first phase 430 is in the on-state. The topmost phase in the figure can be referred to as the sixth phase 440 (or output or last phase). The other phases can be referred to as the second 432, third 434, fourth 436, and fifth phases 438. The output phase 440 can include an output node 414 that provides the summarized PWM output 403—it is not coupled to any other phases, but is instead provided to the load 410, and optionally filtered via optional signal conditioning circuitry 408.

An example of the summarized PWM output 403 is shown in FIG. 5, at $V_{403}$. This summarized PWM output assumes a sinusoidal dynamic setpoint waveform having a voltage, $V_{401}$, and the six phases shown in FIG. 4. The summarized PWM output 403 tracks the dynamic setpoint waveform via six "steps", one for each phase in FIG. 4, and within each step there is a PWM waveform that is instantaneously equal to the proportion of the distance between the steps. To explain further, if the input voltage is 2.4 volts, each comparator will have a duty cycle of 40%. With six interleaved power conversion stages, for every moment in time at least two of the power conversion stages will always have an upper switch in an on state. In addition, 40% of the time, three of the power conversion stages will have the lower switch in an on state. During the time the dynamic setpoint waveform transitions from 2 volts to 3 volts the output will always have either one or two of the phases with an upper switch in an on state. In addition, as the voltage moves from 2 to 3 V (assuming each DC power supply is 1 V), the output also has a PWM moving from 200 volts to 300 volts and it has an instantaneous duty cycle proportional to the voltage as it transitions from 2 volts to 3 volts. The amplitude of each step is equal to one of the DC power supplies 422, or the voltage rail, and thus the peak-to-peak voltage of the summarized PWM output 403 is N times the DC power supply or rail voltage. For instance, if each phase was powered by a 5 V power supply or rail, then the peak-to-peak voltage of the summarized PWM output 403 would be 30 V, and each step would be 5 V. As another example, assume each of the switch pairs 420 has a 0-100 V output. The summarized PWM output 403 would be 0-600 V (as there are 6 stages). As the input voltage for each phase swings from 0-100 V, the summarized PWM output 403 swings from 0-600 V. Said another way, the series topology sees voltage summed at the summarized PWM output 403, while the current remains the same through each phase. In contrast, we'll see that the parallel topology sums current and is powered from the same rail-to-rail voltage through each phase.

Additionally, the frequency of the PWM signal within each step may be observed to be N times the fundamental switching frequency, f, of any one of the switches 420 (e.g., six times the fundamental frequency, f, of 200 kHz or 1.2 MHz). Described another way, for a flash power converter having six phases, and the switches switching at 200 kHz, the summarized PWM output tracks the dynamic setpoint waveform with only a delay inherent to devices in the power chain (i.e., otherwise an instantaneous tracking of the input setpoint). The summarized PWM output 403 tracks the dynamic setpoint waveform to within 1/N (e.g., ⅙) times the peak-to-peak voltage of the summarized PMW output 403, and has a ripple PWM instantaneously following the dynamic setpoint waveform at a frequency of 1.2 MHz. As such, in some embodiments, the switching speed of each of the plurality of additivite PWM power conversion stages is 20-800 kHz. In some embodiments, greater than 150 kHz switching speeds can be achieved even where a filter is arranged between the flash power converter and the load.

Consider now a flash power converter having 24 interleaved power conversion phases. The output ripple in this case is reduced from ⅙ to 1/24. The ripple would have a PWM frequency of N*f or 24*200 kHz=4.8 MHz. Along these same lines, while prior art methods would need to apply filtering to smooth the ripple, where the filtering was limited by the switching frequency of a given switch (e.g., a large LC filter), the present disclosure enables a much higher "effective switching frequency" from the standpoint of filtering—here filtering would be limited to 4.8 MHz. Since higher frequencies can be filtered with smaller filter components, the disclosed summarized PWM output is more easily filtered than prior art power conversion outputs, despite using similar switching devices (though a radically different topology and driving circuitry). In some cases, to address the reduced size ripple and increased frequency ripple of the summarized PWM output over prior art power conversion outputs, the necessary filter can be reduced by a factor of $N^2$.

It should be understood that for many applications it can be enough to simply increase the number of power conversion stages to the point that no filter is required.

Where an output filter is necessitated, a feedback loop may be used, in which case the feedback can be taken prior to the output filter. The feedback loop can be arranged between the summarized output and the dynamic setpoint input. In this way the unity gain crossover frequency of the feedback is not related to conventional limitations such as switching frequency, output filter or Nyquist criteria. In other words, the unity gain crossover frequency can be greater than $\frac{1}{5}^{th}$ of the fundamental switching frequency or can be greater than ½ of the fundamental switching frequency or can be greater than the fundamental switching frequency.

Referring back to FIG. 2, one can appreciate that the PWM output 206 of a single comparator 418 provides no information about the input voltage ratio of the peak-to-peak of 202 and a value of 204 at a given point in time, and thus even though the instantaneous duty cycle of 206 is related to the input voltage ratio of 202 and 204, there is no known way to extract and use this information. When that singular comparator 418 output is summed between multiple comparators with a 1/N of the fundamental switching period offset between their reference waveform inputs, as shown in FIGS. 4 and 8, $V_{403}$ in FIG. 5 shows that the instantaneous relationship between comparator 418 output and the input voltage ratio begins to take form—be observable and useful. As the number of phases increases, this information becomes more clear (e.g., see FIG. 12) and less filtering is needed to recover the original dynamic setpoint waveform (i.e., to remove the ripple or at least make the ripple negligible for a given application). FIG. 6 again shows a voltage of the dynamic setpoint waveform, $V_{401}$, (at 401 in FIG. 4), a voltage of one of the single PWM outputs, $V_{405}$, from one of the comparators 418, and a voltage of the summarized PWM output, $V_{403}$. Unlike FIG. 5, FIG. 6 also shows the voltage and current ($V_{307}$, $I_{307}$) after filtering with optional signal conditioning circuitry 408; after filtering there is near perfect recovery of $V_{401}$. The illustrated waveforms in FIG. 6 are relative to a sequential firing order of the six phases, for instance, fifth phase 438 following sixth phase 440, fourth phase 436 following fifth phase 438, and so on, though other orders of firing can also be implemented. For example, fourth phase 436 may follow sixth phase 440, etc. By changing the firing order, voltage stress across coupling magnetics may be reduced thereby allowing further component reduction and/or reliability.

Each phase 430-440 may include its own DC power supply 422 as shown. Each DC power supply 422 may be isolated and floating. Each DC power supply 422 may include a positive side and a negative side. The positive side of each DC power supply 422 can be coupled to a first switch of the switch pair 420 in each phase. The negative side of each DC power supply 422 can be coupled to a second switch of the switch pair 420 in each phase. Each switch can have an output coupled to the output 414 and an input, where the input for the first switch is coupled to the positive side of the corresponding DC power supply 422 and the input for the second switch is coupled to the negative side of the corresponding DC power supply 422. The input to the second switch of phase 430 is coupled to ground. The input to the second switch of the other phases is coupled to an output 414 of a previous phase (e.g., a lower phase in FIG. 4).

Various components in the flash power converter 400 may have inherent delays. First, the comparators 418 may have a delay of a few nanoseconds. The drivers 419 may have a delay of 5-30 ns. The power conversion switches 420 may have a delay of 20 ns before beginning to transition. The transition time of the switches 420 may be 10 n to a few microseconds. All these inherent delays are related to power levels and types of devices. For one example, let us assume the switches 420 are SiC FETs capable of switching 40 A at 1200 V. The delay time of these switches 420 may be on the order of 15 ns. The switching time may be on the order of 50 ns. The driver 419 may have a delay of 20 ns. The total inherent delay for this example may be on the order of 100 ns.

Figure 3:
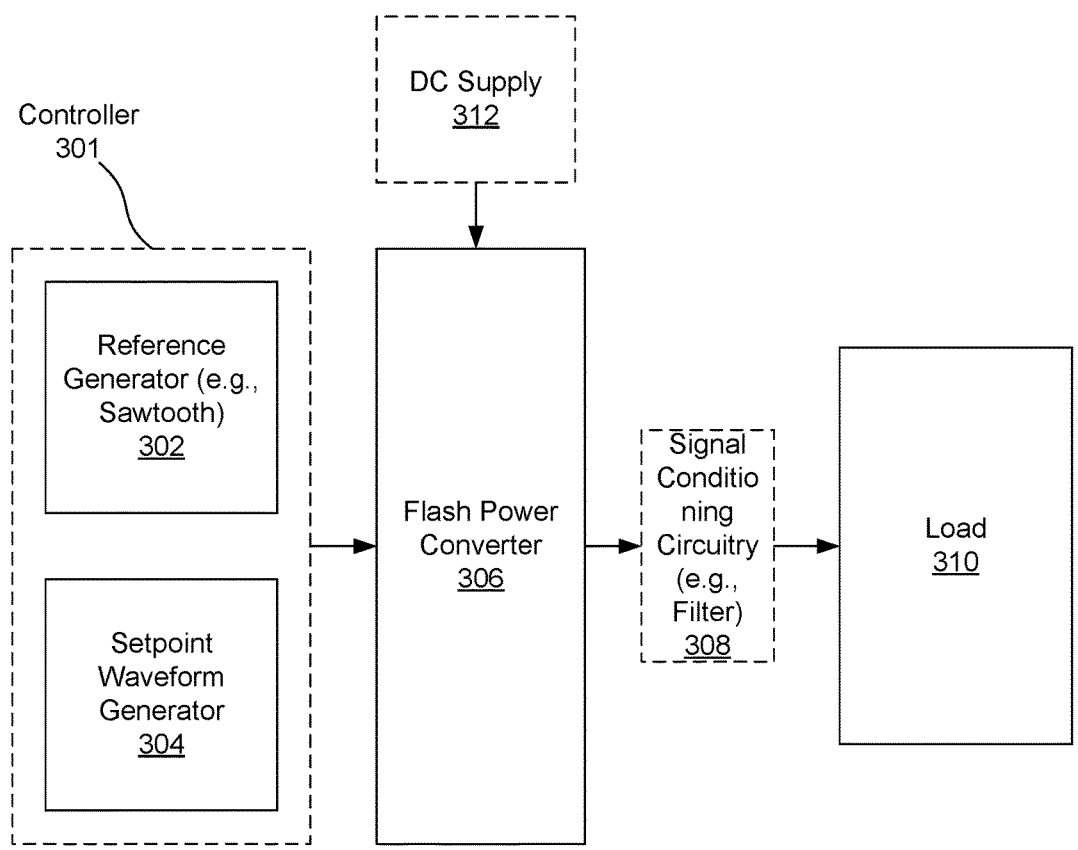
FIG. 3 illustrates an embodiment of a flash power converter coupled to an optional controller and providing converted power to a load, optionally through single conditioning circuitry.
Figure 7:
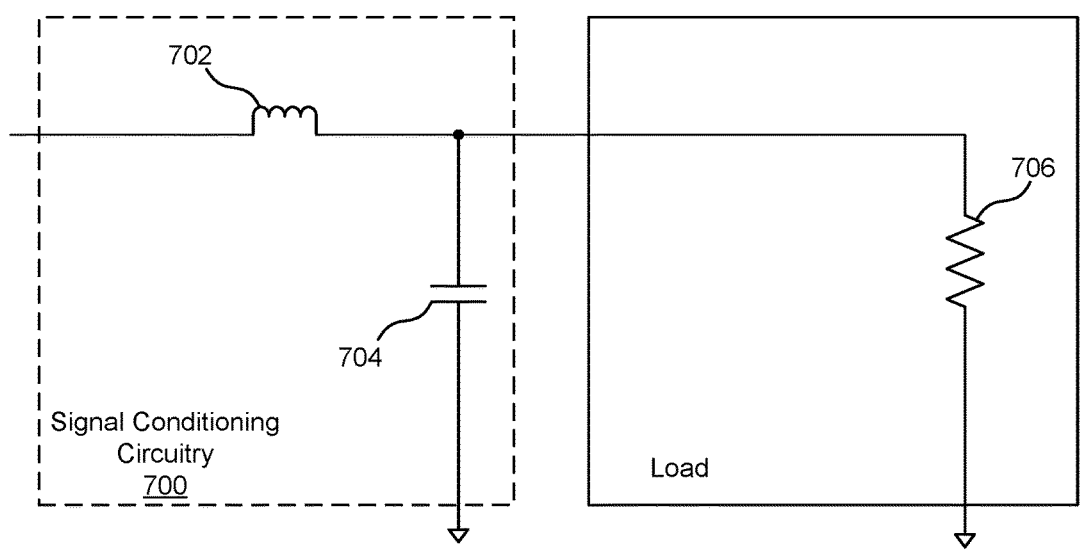
FIG. 7 illustrates one implementation of signal conditioning circuitry.

FIG. 7 illustrates one implementation of signal conditioning circuitry such as 308 in FIG. 3. The signal conditioning circuitry 700 can be arranged between a summarized PWM output (e.g., 403 or 803) and a load (e.g., 410, 810). The load can include a resistive element 706 or device. The signal conditioning circuitry 700 can include an LC filter in one example, comprising an inductive component 702 in series with the summarized PWM output and the resistive element 706, and a shunt capacitive component 704 in series between ground and the resistive element 706. The signal conditioning circuitry 700 can remove or reduce ripple voltage from the summarized PWM output 403 or 803. The inductive component 702 may also help to limit peak-to-peak current ripple in the switches.

The summarized PWM output 403 or 803 can have a ripple voltage, $V_{RI}$. The ripple voltage, $V_{RI}$, is the summarized PWM output voltage, $V_{OUT}(t)$, at a time t, divided by N $$\left(\text{or } \frac{V_{OUT}(t)}{N}\right).$$

The summarized PWM output 403 or 803 can respond to the dynamic setpoint waveform at the dynamic setpoint input 401 such that after the inherent delays, the summarized PWM output voltage, $V_{OUT}(t)$, at time t, is instantaneously within the ripple voltage, $V_{RI}$, of an input voltage ratio, $V_S/V_R(t)$, at time t, times the full peak-to-peak output voltage range, $V_T$ (for either serial or parallel topologies). In equation form, the summarized PWM output voltage, $V_{OUT}(t)$, is instantaneously within the ripple voltage, $V_{RI}$, of $$\frac{V_S}{V_R}(t) * V_T \qquad \text{Equation (1)}$$

The input voltage ratio, $V_S/V_R(t)$ is a ratio of the dynamic setpoint waveform, $V_S$, at time t, at the dynamic setpoint input 401, over a peak-to-peak voltage of the reference waveform, $V_R$, at the reference waveform input 407. In equation form, the summarized PWM output voltage $V_{OUT}(t)$, at the time t is (after inherent component delays):

$$V_{OUT}(t) = V_T * V_{IR}(t) \pm \frac{V_t}{N} \qquad \text{Equation (2)}$$

Where N is the number of phases and $V_{IR}$ is the input voltage ratio, $V_S/V_R(t)$.

In some conventional designs for use with a DC output, output capacitance is relatively large to assist in maintaining a stable DC voltage at the output. The large output capacitance is also used to maintain a steady output in the presence of load changes such as associated with a rapid change in current draw (increase or decrease), as would be seen in power a microprocessor for instance. In the embodiment of FIGS. 4 and 8, as examples, the output is arbitrary (unless the user desires a DC output), and one advantage is that a relatively low—possibly orders of magnitude lower—capacitive element 704 may be used as there is no need to hold the output voltage steady; indeed, one purpose of this disclosure is to allow the output voltage to change rapidly and hence conventional large capacitors in the optional signal conditioning circuitry 408 may be detrimental to this use. In a DC power supply situation, for example an output capacitor may be 100s of microfarads as compared to values as low as 100 to 1000 times less in the present case. A typical capacitive component 704 in the signal conditioning circuitry 308 could be 10 nanofarads, for example.

The capacitive component 704, in some implementations, may also not be necessary. For instance when driving a speaker, or when sufficient phases, N, are implemented to produce negligible ripple at the summarized PWM output, the capacitive component 704 may not be needed. As another example, where the flash power converter is used to power a subsequent power conversion stage having its own signal conditioning circuitry or filter, the capacitive component 704 may not be needed. For instance, if the flash power converter is used to provide the power for an RF power conversion stage, the low amplitude, high frequency ripple may be negligible and/or removed by the subsequent power stage's filter(s). Along these same lines, the frequency of output ripple is increased by a factor of N, and thus the frequency to be filtered is much higher than a conventional power converter. For instance, assume a switching frequency of the switching pairs to be 200 kHz and 24 phases—the output ripple will occur at 4.8 MHz and be 24 times smaller than a conventional switchmode power converter, and thus the filter may be exceedingly small.

In the specific case of a plasma power system, this disclosure's ability to utilize a relatively smaller capacitive element 704 is advantageous in providing less arc energy in an arc situation within the chamber. As noted earlier, the proposed flash power converter facilitates very fast arc response. Generally speaking, the power may be momentarily disabled or quickly switched to the opposite polarity when an arc is detected within the chamber. Such actions are meant to quickly extinguish the arc, and then allow the plasma to be reignited and returned to normal plasma operation. The dramatically smaller capacitive element 704 allows for much faster power shut down and stores dramatically less arc energy. In general, having complete control of the waveform being impressed on a plasma provides many advantages for ignition, stability and arc management as one skilled in the art will appreciate.

The control electronics, including the comparators and phase delay components, along with switches and drivers can be implemented in analogue or digital domains.

FIG. 8 illustrates an embodiment of a flash power converter with the above-noted parallel summation topology. FIG. 8 utilizes the same driving portion 412 as described relative to the serial version in FIG. 4. Like the serial version, the illustrated parallel variation takes the outputs from the driving portion 412 and drives multiple power conversion phases, each phase having a switching pair (six pairs in the illustrated embodiment).

The single PWM outputs from each comparator, are each passed to a respective driver 819. The drivers 819 provide switching signals to switches 820 in the parallel switching portion 815. In particular, the drivers 819 translate the single PWM signals into two driving signals that are passed to the switches 820 (or switch pairs) of each phase (or four driving signals that are passed to the switches 820 of each phase in a full-bridge configuration—see FIGS. 15-16). For instance, each driver 819 may receive a low voltage PWM signal from a respective comparator and output two higher voltage signals—high enough to drive the switches 820. In this circuit the drivers 819 also translate the drive across any isolation or voltage translation.

The switches 820 are shown in half-bridge configurations in FIGS. 4 and 8. However, they may also be arranged in full-bridge configurations as shown in FIGS. 15 and 16. In one example, the switches may each be a type of MOSFET but other types of switches are also possible such as Si FETs, SiC FETs, IGBTs, and bipolar to name a few. Each phase includes an output node 814, which is taken from between the two switches 820. Each switch pair 820 can have an upper switch coupled to a high voltage rail and a lower switch coupled to ground. Accordingly, when an upper switch is closed, or on, and the lower switch is open, or off, the high voltage rail of the DC power supply 822 (e.g., a voltage supply) is coupled through to the output node 814 of a given phase, and when the upper switch is open, or off, and the lower switch is closed, or on, ground is coupled through to the output node 814 of a given phase. The output nodes 814 are each independently coupled to a primary winding of a corresponding transformer 816 in a parallel summation portion 817.

The transformers 816 form coupled inductors where the term "coupled inductor" refers generally to the output current of one phase being magnetically coupled with the output current of another phase. In one example, to achieve magnetic output current coupling, the primary winding of one phase is connected with the secondary winding of another phase. In the example of FIG. 8 and referring to the sixth phase 840 and the second fifth 838, the output of the primary winding of the first transformer is connected with a secondary winding of a transformer of the fifth phase 838. In the example of FIG. 8, transformers of adjacent phases are interconnected, with the first phase 830 than coupled with the sixth phase 840. However, it is not necessary to interconnect adjacent phases as shown. Nonetheless, in the example illustrated in FIG. 8, there are six phases, with the primary winding interconnected with the secondary winding of the subsequent phase (e.g., the output of the primary winding of the sixth phase 840 is interconnected with the input of the secondary winding of the fifth phase 838, the output of the primary winding of the fifth phase 838 is interconnected with the input of the secondary winding of the fourth phase 836 and so on). The output of the primary winding of the transformer of the first phase 830 in the example of FIG. 8 is connected with the input of the secondary winding of the sixth transformer 840. The outputs of the secondary windings of the respective transformers are all interconnected at a summarized PWM output 803. Thus, the secondary windings of each phase drive the output, while the primary windings of each phase, being coupled with secondary winding, drive current through the secondary windings, which induces primary winding current flow. The cascaded connection of transformers "combines" the output current of each switch pair through the transformers. While FIG. 8 shows one means to couple currents from the various phases, there are numerous methods of coupling the currents of each phase, with another example illustrated and previously discussed relative to FIG. 4, and all methods are considered covered by these examples.

In use, the gate drive pulses for each switch pair are delayed or offset relative to each other (e.g., by 1/N of the fundamental switching period). By action of the interconnected transformers, the currents from each phase are magnetically coupled so that an increase in current in the sixth phase 840 when the sixth switch pair is active, causes current to flow to and be induced in the fifth transformer of the fifth phase 838, even though its switch pair is not active (e.g., the upper switch connected to the high voltage rail is open), and so on to the subsequent transformers. The same sequence holds when each phase leg is active, current from the associated transformer cascades (flows to and is induced in) to the sixth interconnected transformer, and so on. The cascading current continues as various phases are active or inactive.

As an example, if each phase, of a six—phase flash power converter, provides about 17 A at a rail voltage of 750 V, the summarized PWM output 803 will swing between 0 and 750 V at about 100 A, and can provide 75 KW power.

Figure 10:
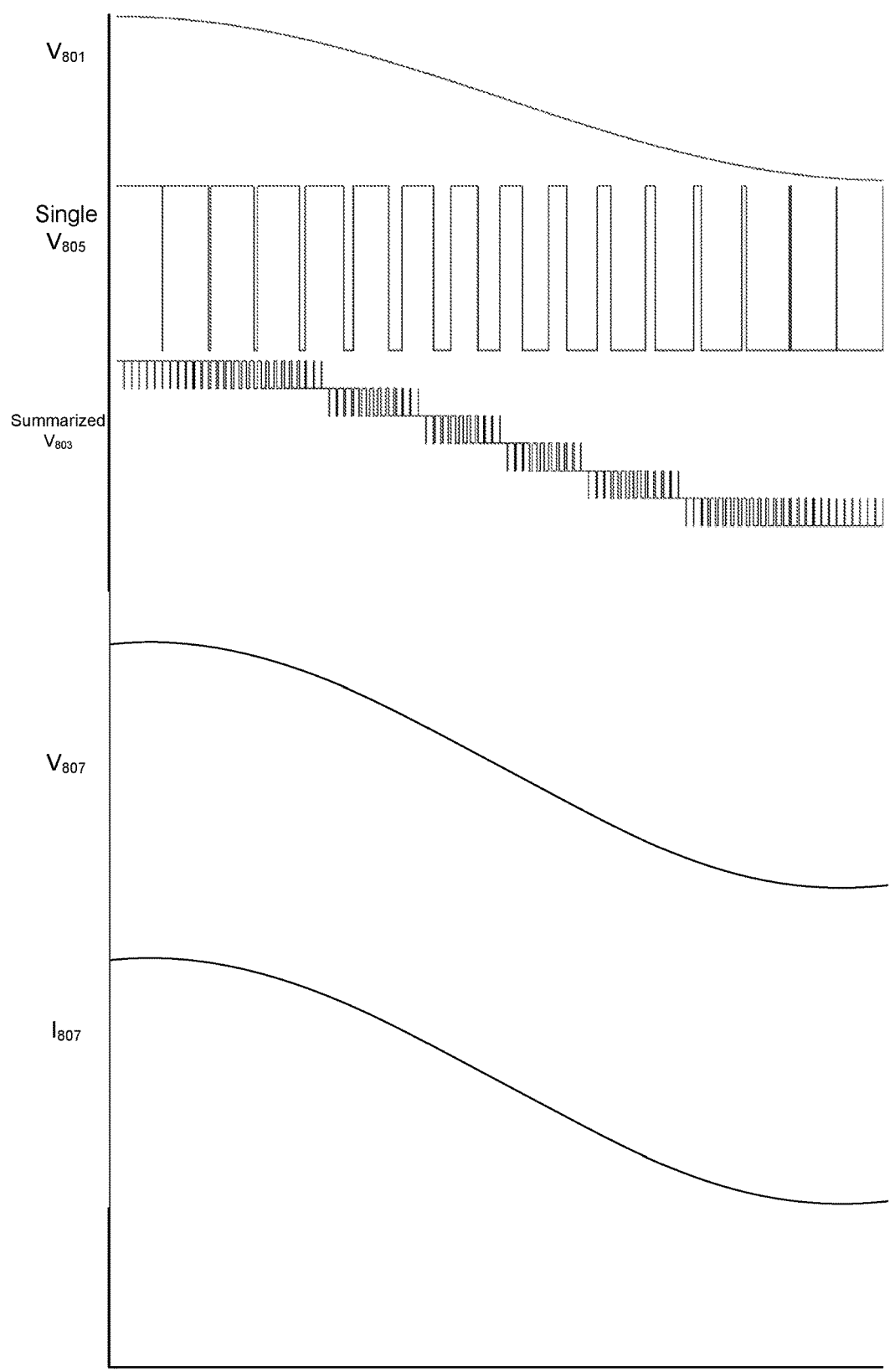
FIG. 10 illustrates one example of waveforms corresponding to the circuitry of FIG. 8.

An example of the summarized PWM output 803 is shown in FIG. 10, as voltage $V_{803}$. This summarized PWM assumes a sinusoidal dynamic setpoint waveform, having a voltage, $V_{801}$, and the six phases shown in FIG. 8. The summarized PWM output 803 tracks the dynamic setpoint waveform via six "steps", one for each phase in FIG. 8, and within each step there is a PWM voltage which is instantaneously equal to the proportion of the distance between the steps. The amplitude of each step is equal to 1/N of the DC power supply 822 (or the voltage rail) and thus the peak-to-peak voltage of the summarized PWM output 803 is equal to the DC power supply 822 or rail voltage. For instance, if the DC power supply 822 is 5 V, then the peak-to-peak voltage of the summarized PWM output 803 would be 5 V, and each step would be ⅚ V. As another example, assume each of the switch pairs 820 has a 0-100 V output. The summarized PWM output 803 would be 0-100 V. As the input voltage for each phase swings from 0-100 V, the summarized PWM output 803 also swings from 0-100 V. However, the currents from each phase add, such that the current $I_{807}$ is N times greater than the current from any one phase (between the switch pairs 820 and the corresponding transformer). Said another way, the parallel topology of FIG. 8, as compared to FIG. 4, sees current summed at the summarized PWM output 803, while the voltage remains the same through each phase. In contrast, the series topology of FIG. 4 sums voltages and maintains the same current through each phase.

Additionally, the frequency of the PWM within each step in FIG. 10 may be observed to be N times the fundamental switching frequency, f, of any one of the switches 820 (e.g., six times the fundamental frequency, f, of 200 kHz or 1.2 MHz). Described another way, for a flash power converter having six phases, and the switches switching at 200 kHz, the summarized PWM output tracks the dynamic setpoint waveform with only a delay inherent to devices in the power chain (i.e., otherwise an instantaneous tracking of the input setpoint). The summarized PWM output tracks the dynamic setpoint waveform to within 1/N (e.g., ⅙) times the peak-to-peak voltage of the summarized PMW output, and has a ripple PWM instantaneously following the dynamic setpoint waveform at a frequency of 1.2 MHz.

Consider now a flash power converter having 24 interleaved power conversion phases. The output ripple in this case is reduced from ⅙ to 1/24. The ripple would have a PWM frequency of N*f or 24*200 kHz=4.8 MHz. Along these same lines, while prior art methods would need to apply filtering to smooth the ripple, where the filtering was limited by the switching frequency of a given switch (e.g., a large LC filter), the present disclosure enables a much higher "effective switching frequency" from the standpoint of filtering—here filtering would be limited to 4.8 MHz. Since higher frequencies can be filtered with smaller filter components, the disclosed summarized PWM output is more easily filtered than prior art power conversion outputs, despite using similar switching devices (though a radically different topology and driving circuitry). In some cases, to address the reduced size ripple and increased frequency ripple of the summarized PWM output over prior art power conversion outputs, the necessary filter can be reduced by a factor of $N^2$.

It should be understood that for many applications it can be enough to simply increase the number of power conversion stages to the point that no filter is required.

Where an output filter is necessitated, a feedback loop may be used, in which case the feedback can be taken prior to the output filter. In this way the unity gain crossover frequency of the feedback is not related to conventional limitations such as switching frequency, output filter or Nyquist criteria.

Various components in the flash power converter 800 may have inherent delays as described relative to FIG. 4. For instance, inherent delays of around 100 ns may be found.

Although FIG. 8 is shown with a single DC power supply and a high and low voltage rail provided to each phase, the isolated floating DC supplies for each phase, of FIG. 4, could also be implemented. Alternatively, each phase may be coupled to a high and low voltage rail, that may be powered, for instance, by an external DC power supply, such as optional DC power supply 312 in FIG. 3. In the case of an external DC power supply, the ripple at the summarized PWM output 403 has an amplitude of the external DC power supply divided by N.

FIG. 10 illustrates waveforms corresponding to the circuitry of FIG. 8. Notably, the single PWM output voltage, $V_{605}$, is the same height as the peak-to-peak voltage of the summarized PWM output voltage, $V_{603}$. Compare this to FIG. 6 for the serial version, where the single PWM output was 1/N times the peak-to-peak summarized PWM output. Similarly, here the steps in the summarized PWM output voltage, $V_{603}$, are 1/N times the single PWM output voltage, $V_{605}$.

Figure 11:
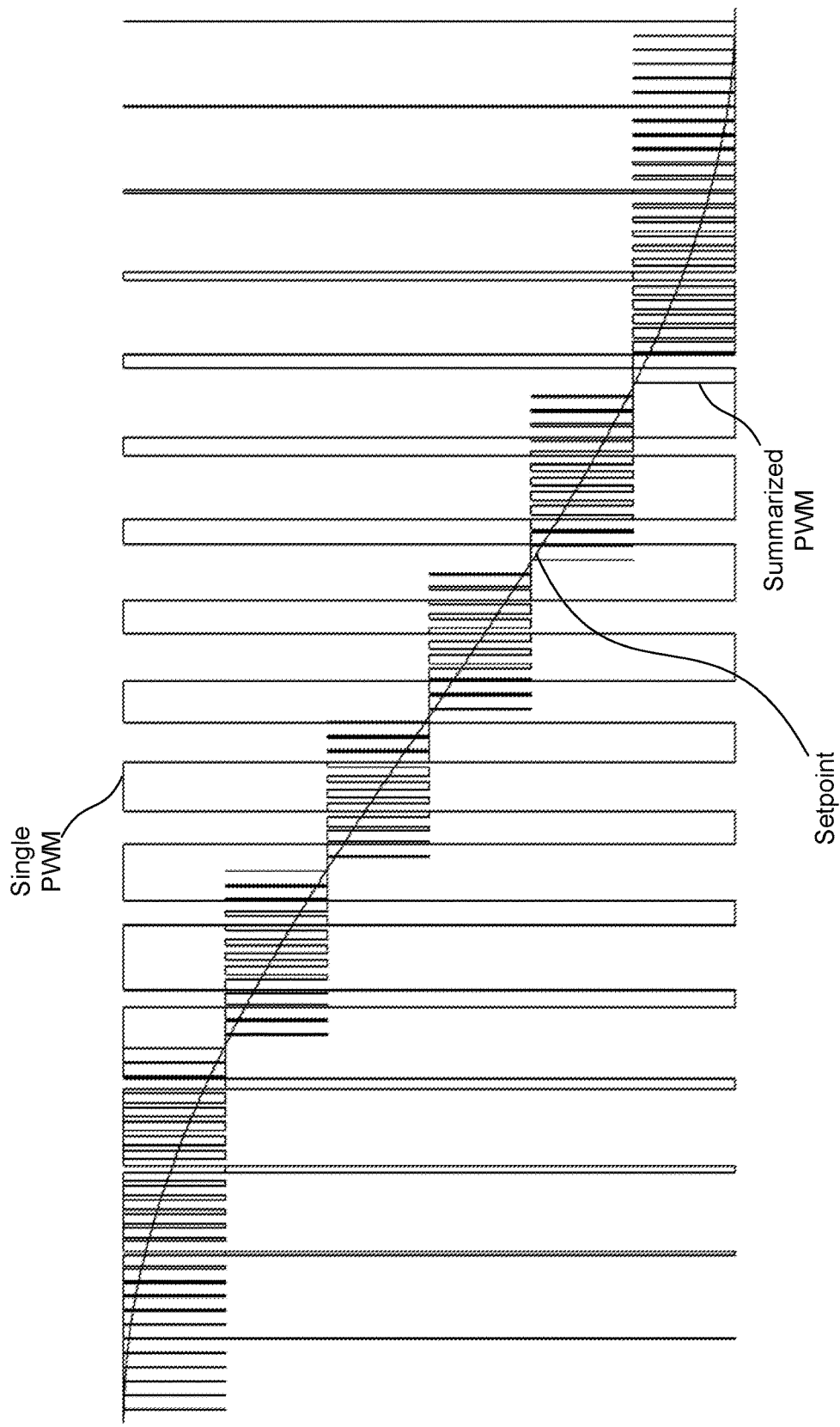
FIG. 11 is an expanded view of a portion of the waveforms of FIG. 10 to more clearly illustrate the interaction of the various waveforms.

FIG. 11 is an expanded view of a portion of the waveforms of FIG. 10 to more clearly illustrate the interaction of the various waveforms.

Figure 18:
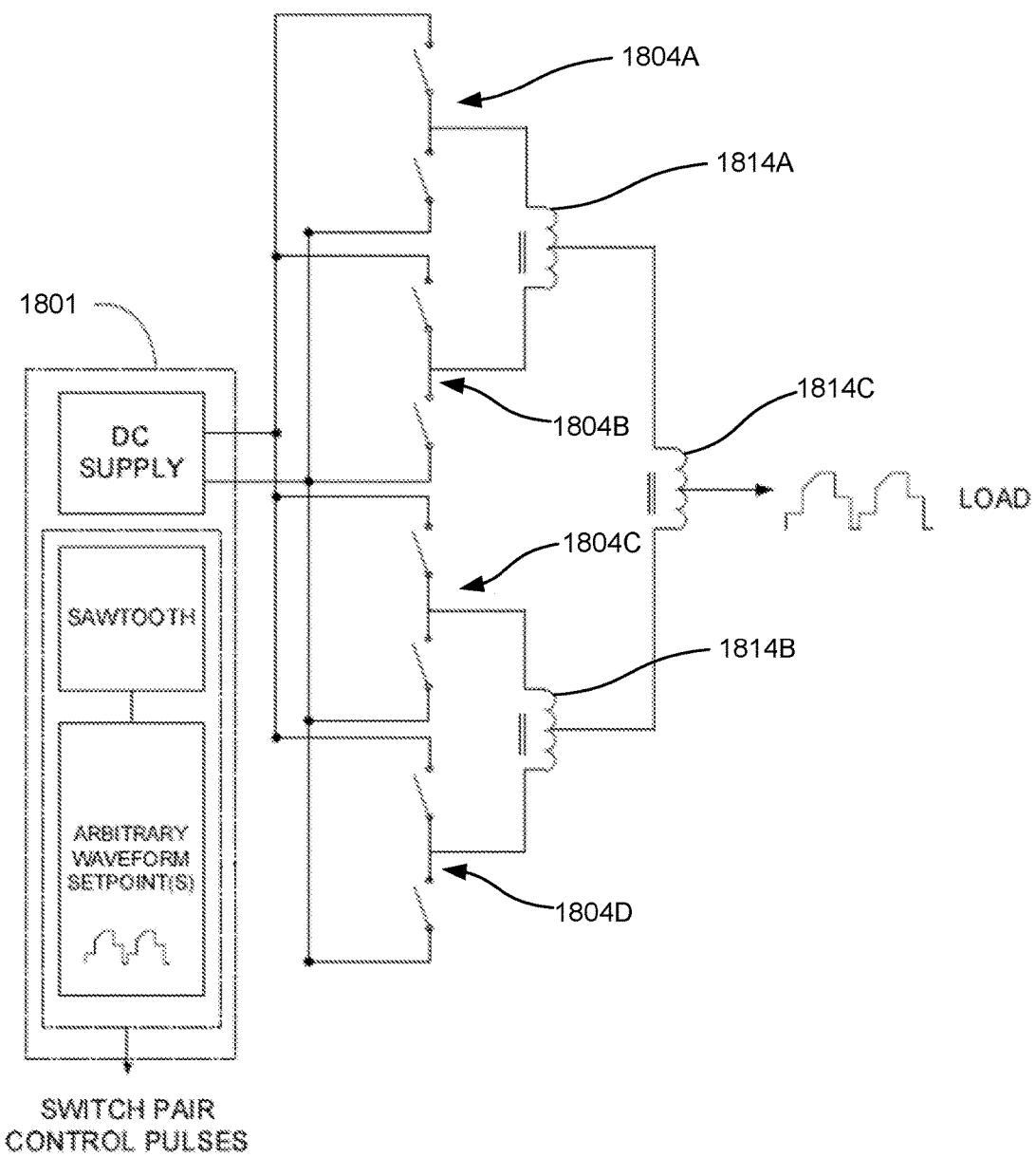
FIG. 18 illustrates an alternative embodiment of flash power converter using the parallel configuration according to aspects of the present disclosure.

FIG. 18 illustrates an alternative embodiment of a flash power converter using the parallel configuration according to aspects of the present disclosure. In this example, four phases are illustrated, and the coupled inductor technique leading to magnetic coupling between phase currents is achieved with a different arrangement of transformer elements than seen in FIG. 8. In common with the embodiment illustrated in FIG. 8, each phase includes a respective switch pair powered by a DC supply and driven by a controller 1801, and where the PWM pulse trains to each switch pair are interleaved to drive the desired output waveform to a load.

Output current of the first switch pair (first phase) 1804A is provided to a first transformer 1814A. Similarly, output current of the second switch pair (second phase) 1804B is provided to the first transformer 1814A. Like the interconnection of transformers shown in FIG. 9, e.g., between phase one and phase two, the arrangement combines the output currents of phase one and phase two (buck converters). The output current of the third switch pair (phase three) 1804C is provided to a second transformer 1814B as is the output current of the fourth switch pair (phase four) 1804D. A third transformer 1814C is coupled with outputs of the first and second transformers 1814A and 1814B.

The third transformer 1814C combines the currents from the first and second transformers 1814A and 1814B and provides a summarized PWM output to the load, which includes a summed current of all phases. Although not shown, conditioning circuitry or filtering may be arranged between the third transformer 1814C and the load. One advantage, among many, is a power supply conforming with aspects of the present disclosure may produce a complex output waveform suitable to driving various possible loads such as a plasma, one representative example of such a waveform being illustrated between the load and the third transformer 1814C. This example output waveform is based on the dynamic setpoint waveform within the controller.

With either the serial or parallel topology, half or full-wave switch configurations, or any other variation of the disclosed flash power converter, a wide variety of distinct power supply types may be replaced with the flash power converter operating under a control scheme for whatever power supply is being replaced. In the case of plasma systems, for example, the highly controllable and configurable nature of the flash power converter provides for an ability to alter process (how the plasma is ignited and controlled, particularly considering complicated power waveforms) without concern for the hardware of the power supply. For example, using a flash power converter, a process engineer may effectively "draw" a desired waveform as an input waveform or to modify a waveform for a plasma, and execute the process.

Figure 9:
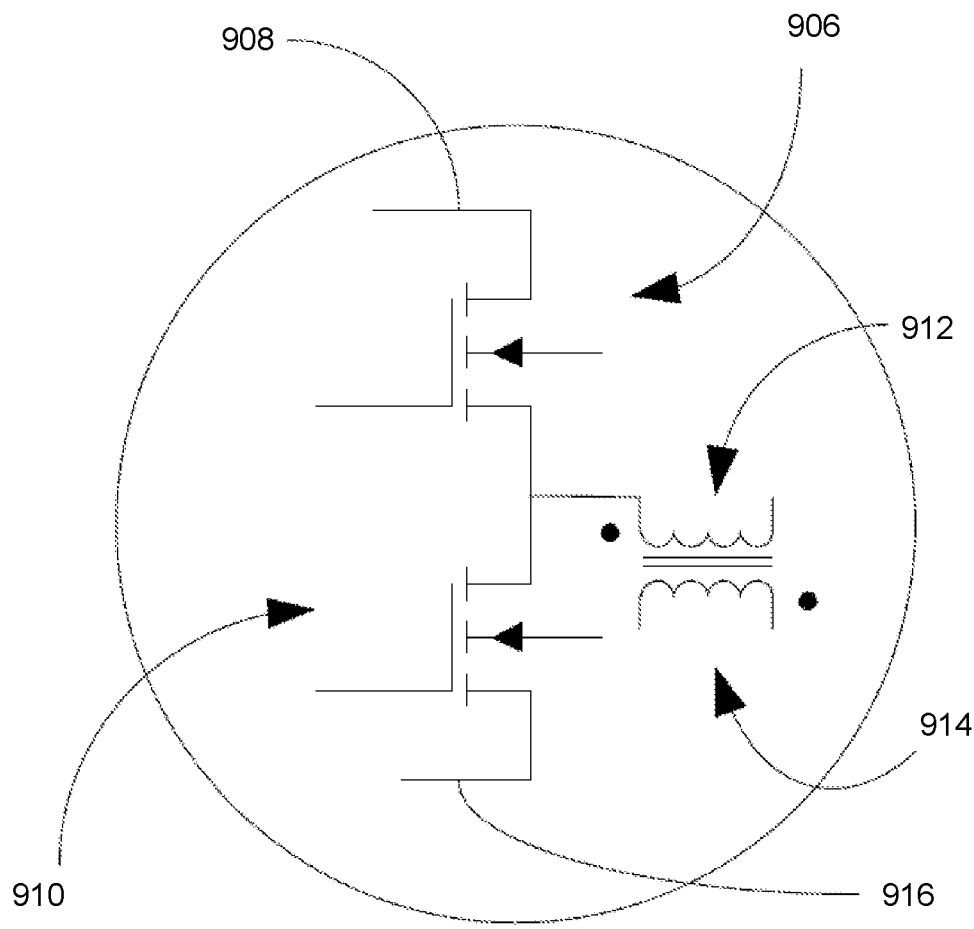
FIG. 9 illustrates an example of a switchmode power conversion stage that could be implemented in the embodiment of FIG. 8.

In the case of a MOSFET based switch pair used in the phases of FIG. 4 or 8, FIG. 9 illustrates a pair of MOSFETs 906, 910 interconnected such that the drain of an upper MOSFET 906 of the pair is connected to the DC supply at a rail 908 (which may be referred to as a rail voltage), and the source of the upper MOSFET 906 is connected to a drain of a lower MOSFET 910 of the pair which is also the input point of a primary winding 912 of a transformer. The source of the lower MOSFET 910 is connected to a negative rail 916, which may be coupled with a ground of the DC supply, which may or may not be floating, or a negative voltage of the DC supply.

Figure 12:
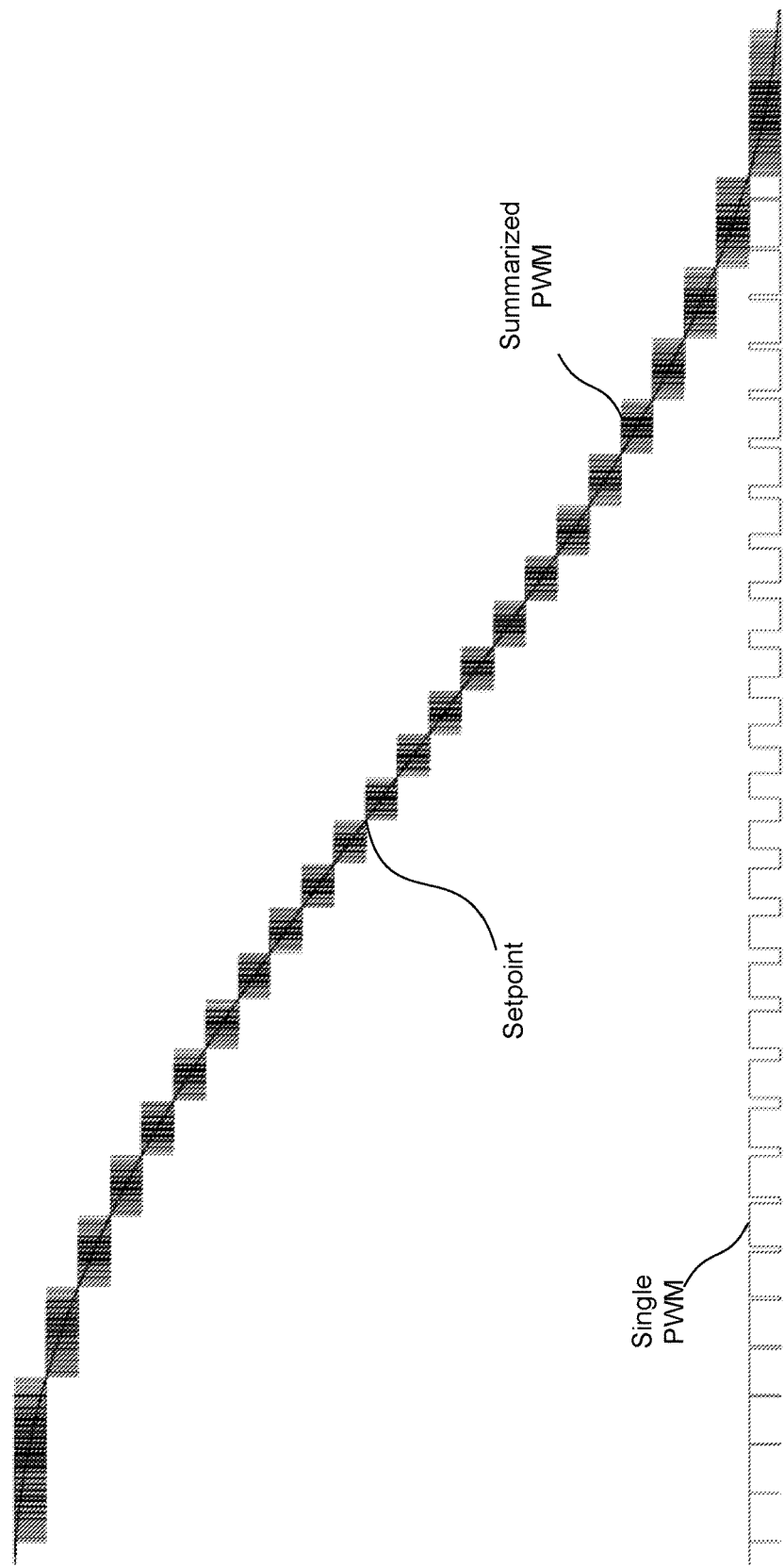
FIG. 12 illustrates waveforms associated with a 24-phase implementation of the serial or parallel flash power converter.

FIG. 12 illustrates waveforms associated with a 24-phase implementation of the serial or parallel flash power converter. A single PWM output from one or the comparators (e.g., 418) is shown, along with a dynamic setpoint waveform, and the summarized PWM output resulting from the serial or parallel summing of outputs from 24 phase delayed comparators. In this embodiment, the output ripple is 1/N the output ripple seen by a single power converter in the art. The ripple frequency is also N times greater than the fundamental switching frequency, f.

FIG. 13 shows an expanded view of FIG. 12 showing an instance where a sinusoidal dynamic setpoint waveform sees a vertical step between two values (i.e., no time delay), and the ability of the summarized PWM output to nearly-instantly track this voltage step.

FIG. 14 shows a further expansion of the waveforms in FIG. 13. At the moment of the step change both waveforms lie on top of each other. Immediately prior to the step change there is a summarized PWM output containing the instantaneous duty cycle for the individual 1/N amplitude segment. During the instantaneous step the summarized PWM output waveform also changes instantaneously to the new segment of 1/N. The duty cycle of the summarized PWM output now still matches the duty cycle of this 1/N segment. Prior to the step one may observe a duty cycle of that segment to be approximately 75 or 80%. Immediately after the step one may observe a duty cycle of that segment as being close to 50%. At all times the duty cycle remains the instantaneous value of the input over the particular output segment.

As the number of such summarized, interleaved switch-mode power conversion stages/phases increases, the summarized PWM output has smaller and smaller steps (e.g., FIG. 5 has 6 steps and FIG. 12 has 24 steps) with increasing PWM frequency in each step. One may observe as additional power conversion stages are added, the ripple decreases resulting in the summarized PWM output appearing to more closely approach the dynamic setpoint waveform. Accordingly, the more phases are used, the more that the summarized PWM output approaches an ideal instantaneous response or tracking of the dynamic setpoint waveform.

Figure 17:
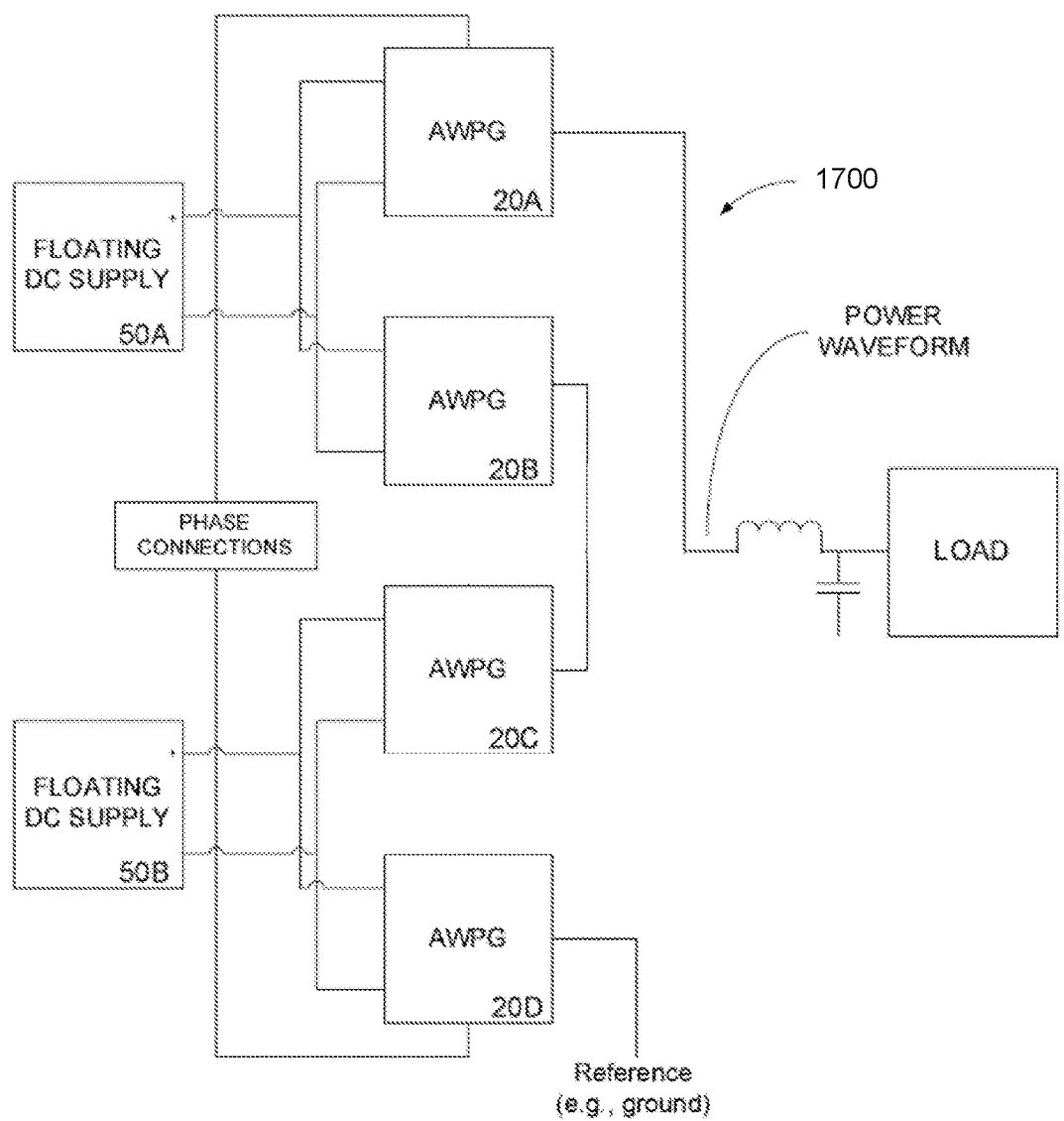
FIG. 17 illustrates an embodiment of multiple flash power conversion assemblies in combination to achieve the same effect as adding more phases to a single flash power converter.

FIG. 17 illustrates an embodiment of multiple flash power conversion assemblies in combination to achieve the same effect as adding more phases to a single flash power converter. For both FIGS. 4 and 8, assuming a block with some number of phases, rather than simply adding phases to the block in order to vary the possible output power, one advantage of the design is that a block 1700, such as shown in FIG. 17, may instead be replicated and such blocks powered and interconnected in different ways to provide a different range of possible highly controllable waveform outputs (e.g., a single block design using a 750 Volt DC supply to provide an arbitrary waveform of 0 to 750 Volts), or a four block design using a pair of 750 Volt DC supplies to provide an arbitrary waveform with −1500 to +1500 Volts. The distributed phases of a single block and interconnected block strategy provides for practical implementation of lesser sized/capacity components than simply adding phases to a block driving up the current handling, heat handling, and other attributes of any given component, which provides advantages of component costs, scalability, and reliability among others.

Besides the ability to produce highly controllable and arbitrarily shaped output waveforms that nearly instantly track a dynamic setpoint waveform, the disclosed flash power converter provides for such converters to be interconnected in various ways to produce various multiples of the output of any converter. FIG. 17 provides one example of such interconnected flash power converter. One advantage illustrated by this example, among various advantages, is the ability of a core flash power converter block to be configured in various ways to produce various different power supply outputs not possible with a single block and without having to modify the architecture of the block (e.g., without adding phases to a block). Hence, by combining flash power converters with a DC supply or supplies, a wide range of different outputs may be generated beyond the capability of a single flash power converter. It should be noted, however, that the various output ranges possible from using flash power converter blocks may alternatively be achieved by adding phases to any given flash power converter configuration. Moreover, in some instances, it may be advantageous to modify the base functionality of the six phase design illustrated in FIGS. 4 and 8 by adding or removing phases.

FIG. 15 illustrates an embodiment of a flash power converter that sums two sets of switching pairs in parallel to provide a bipolar output. A DC power supply rail is coupled to top and bottom switches of each switching pair. A first set of switching pairs (left) each have output nodes coupled to a node between switches of switching pairs of the second set (right). One of the outputs 1502 from the first set (left) is not provided to a switching pair of the second set, but instead is provided as a second of two outputs for the bipolar summarized output 1506. One of the nodes 1504 between switches of the second set (right) is provided as a first of two outputs for the bipolar summarized output 1508. An additional phase delay 1510 is provided to affect a phase delay between a last phase 1512 of the first set compared to a last phase 1514 of the second set.

FIG. 16 illustrates another embodiment of a flash power converter that sums two sets of switching pairs in series to provide a bipolar output. In this case outputs from the switching pairs are coupled to a lower switch and low voltage side of an isolated floating DC power supply of a next phase. Outputs of the two top phases are instead provided to an output node of the bipolar summarized output.

Figure 21:
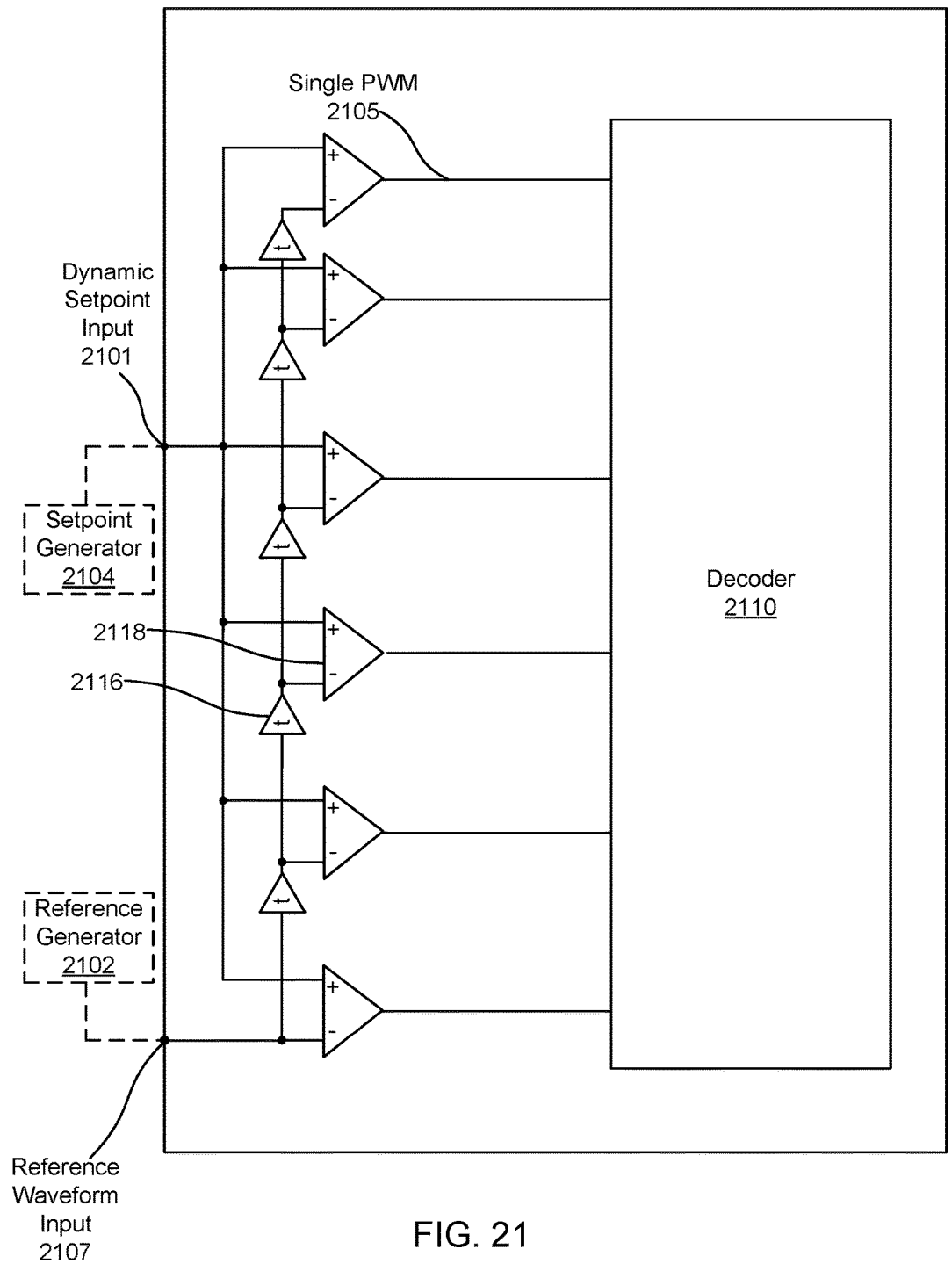
FIG. 21 illustrates an analogue-to-digital converter (ADC) according to one embodiment of this disclosure.

FIG. 21 illustrates an analogue-to-digital converter (ADC) according to one embodiment of this disclosure. The ADC can include a dynamic setpoint input 2101 configured to receive a dynamic setpoint waveform (e.g., an arbitrary and non-constant waveform) from a setpoint waveform generator 2104. The ADC can also include a reference waveform input 2107 configured to receive a reference waveform from a reference generator 2102 (e.g., a triangle wave). The dynamic setpoint waveform and the reference waveform can be provided to two or more comparators 2118, where the reference waveform can be phase delayed between each comparator 2118, for instance by phase delay components 2116. The phase delay can be equal to 1/N of the fundamental switching period, where N is the number of comparators or phases in the ADC. Each comparator 2118 can generate a single PWM output 2105 based on a comparison of the dynamic setpoint waveform and the reference waveform, where the reference waveforms provided to the comparators 2118 are interleaved. These single PWM outputs 2105 can be provided to a decoder 2110 that summarizes the multiple single PWM outputs 2105. This ADC achieves the same bit resolution as a conventional ADC with a similar number of comparators, but in this case with infinite resolution and higher speed.

Figure 23:
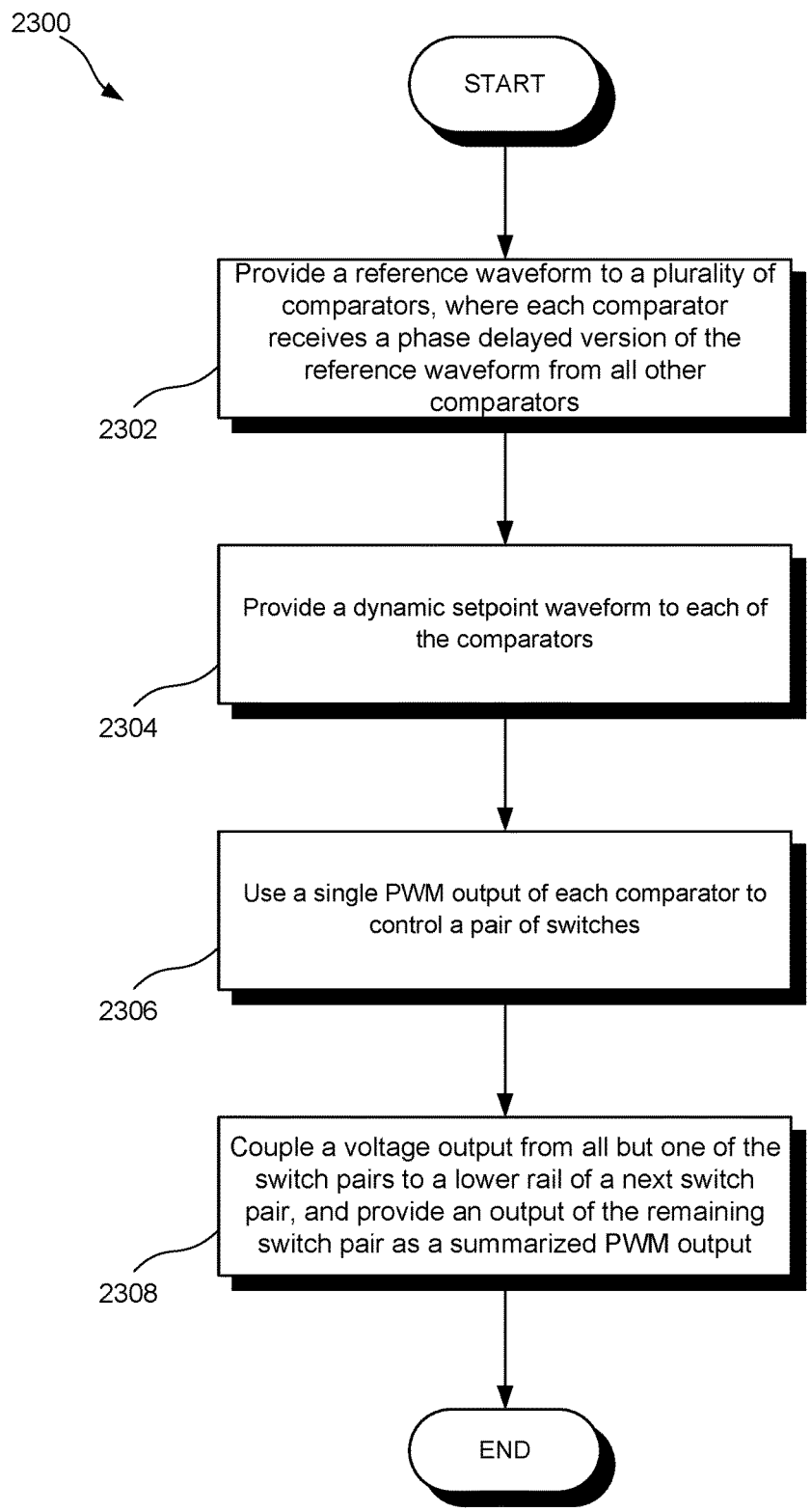
FIG. 23 illustrates an embodiment of a method for controlling a summarized PWM output.

FIG. 23 illustrates an embodiment of a method for controlling a summarized PWM output using a serial topology. The method 2300 includes providing a reference waveform to a plurality of comparators, where each comparator receives a phase delayed version of the reference waveform from all other comparators (Block 2302). The method 2300 can further include providing a dynamic setpoint waveform to each of the comparators (Block 2304). The method 2300 can also include using a single PWM output of each comparator to control a pair of switches (Block 2306). The method can yet further include coupling a voltage output from all but one of the switch pairs to a lower rail of a next switch pair, and providing an output of the remaining switch pair as a summarized PWM output (Block 2308).

Figure 19:
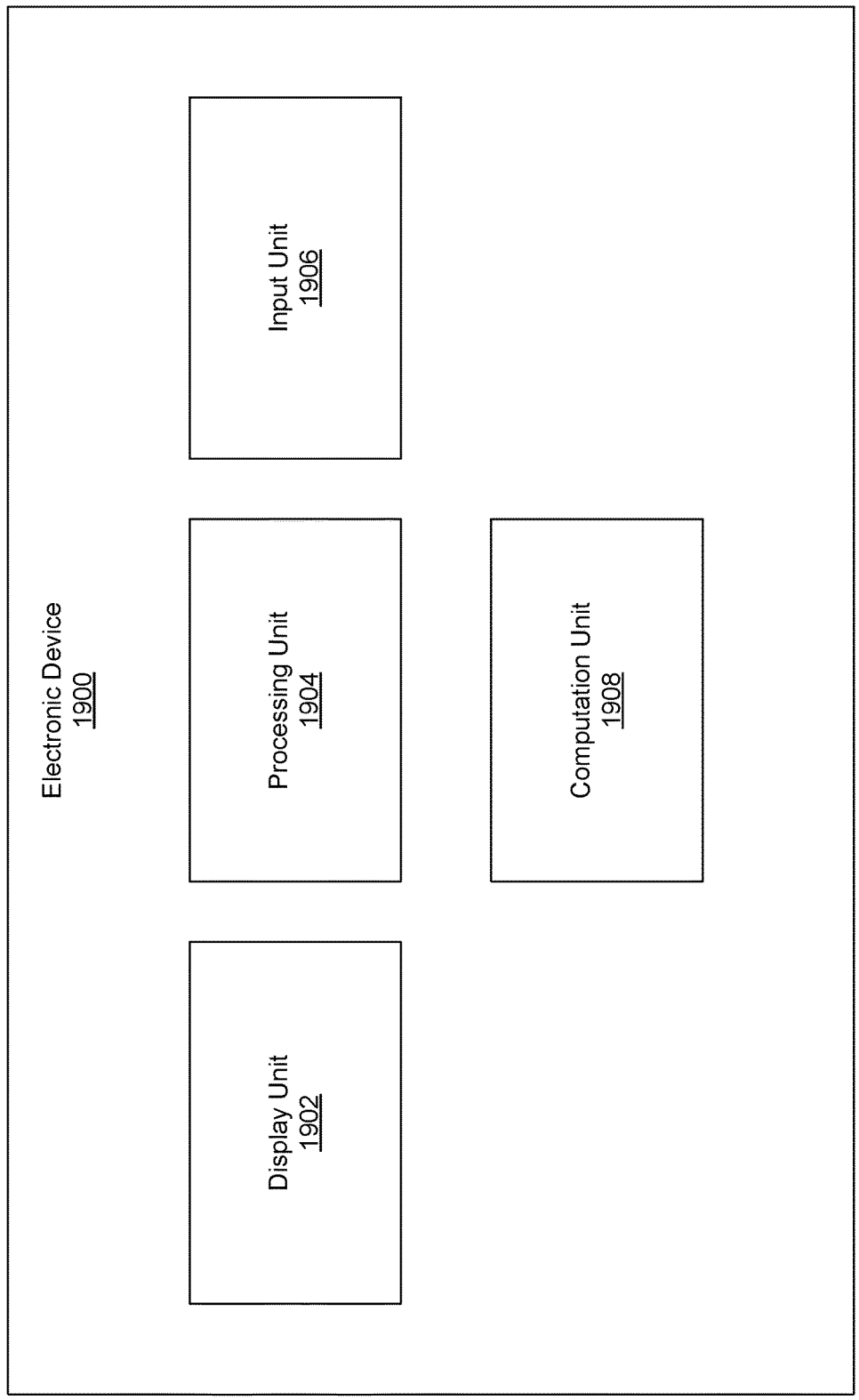
FIG. 19 illustrates an electronic device arranged to perform various operations of the presently disclosed technology.

Turning to FIG. 19, an electronic device 1900 including operational units 1902-1908 arranged to perform various operations of the presently disclosed technology is shown. The operational units 1902-1908 of the device 1900 are implemented by hardware or a combination of hardware and software to carry out the principles of the present disclosure. It will be understood by persons of skill in the art that the operational units 1902-1908 described in FIG. 19 may be combined or separated into sub-blocks to implement the principles of the present disclosure, and not all units included in an implementation. Therefore, the description herein supports any possible combination or separation or further definition of the operational units 1902-1908.

In one implementation, the electronic device 1900 includes a display unit 1902 configured to display information, such as a graphical user interface, and a processing unit 1904 in communication with the display unit 1902 and an input unit 1906 configured to receive data from one or more input devices or systems. Various operations described herein may be implemented by the processing unit 1904 using data received by the input unit 1906 to output information for display using the display unit 1902. A controller my not include a display unit. Additionally, in one implementation, the electronic device 1900 includes units implementing the operations described with respect to the various figures.

Figure 20:
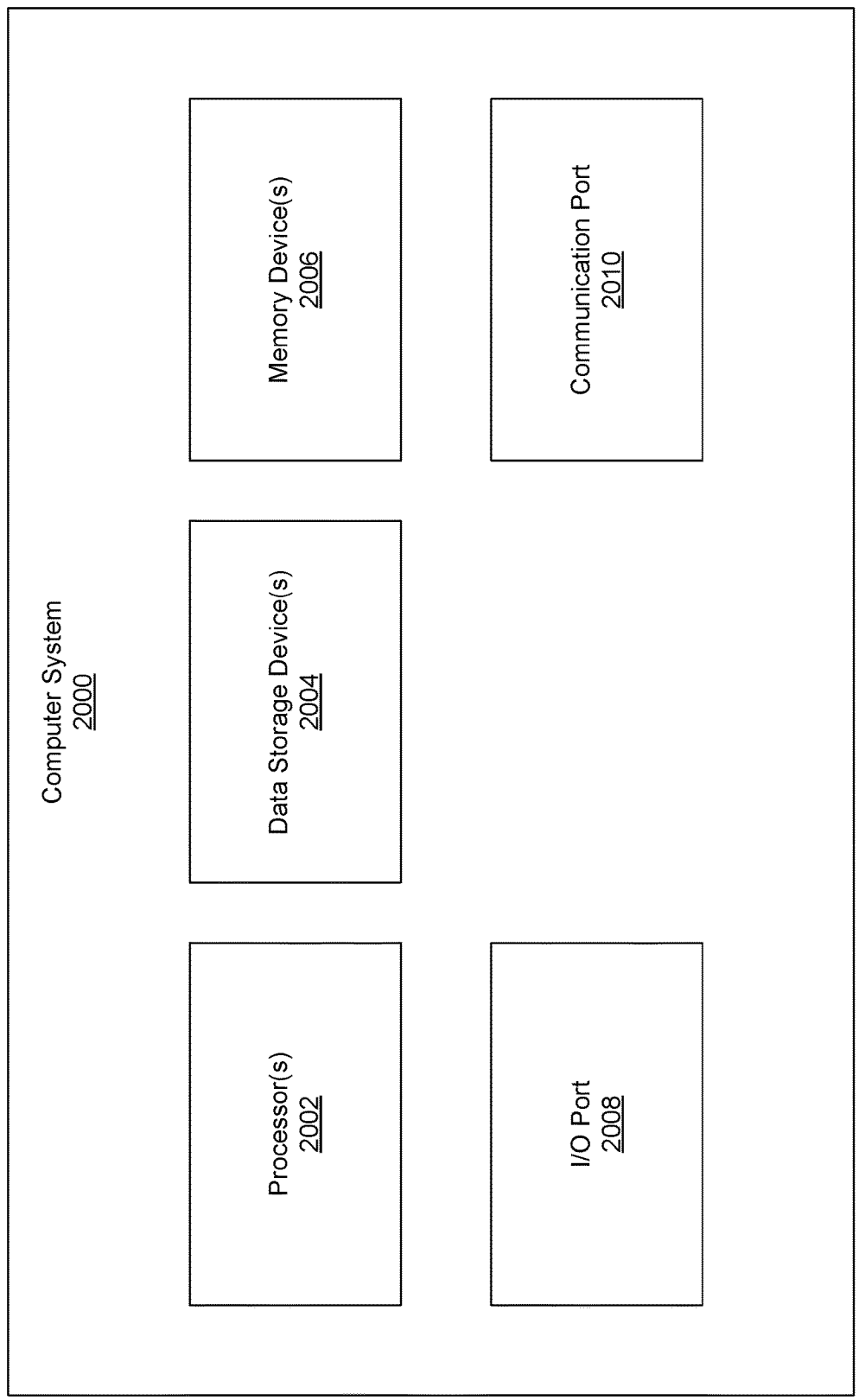
FIG. 20 a detailed description of an example computing system having one or more computing units that may implement various systems and methods discussed herein is provided.

Referring to FIG. 20, a detailed description of an example computing system 2000 having one or more computing units that may implement various systems and methods discussed herein is provided. The computing system 2000 may be applicable to the controller or controllers, the measurement system, an impedance matching system integrating same or all functions discussed herein, the computational unit, and other computing or devices related to the systems such as control functions. It will be appreciated that specific implementations of these devices may be of differing possible specific computing architectures not all of which are specifically discussed herein but will be understood by those of ordinary skill in the art.

The computer system 2000 may be a computing system is capable of executing a computer program product to execute a computer process. Data and program files may be input to the computer system 2000, which reads the files and executes the programs therein. Some of the elements of the computer system 2000 are shown in FIG. 20, including one or more hardware processors 2002, one or more data storage devices 2004, one or more memory devices 2008, and/or one or more ports 2008-710. Additionally, other elements that will be recognized by those skilled in the art may be included in the computing system 2000 but are not explicitly depicted in FIG. 20 or discussed further herein. Various elements of the computer system 2000 may communicate with one another by way of one or more communication buses, point-to-point communication paths, or other communication means not explicitly depicted in FIG. 20.

The processor 2002 may include, for example, a central processing unit (CPU), a microprocessor, a microcontroller, a digital signal processor (DSP), and/or one or more internal levels of cache. There may be one or more processors 2002, such that the processor 2002 comprises a single central-processing unit, or a plurality of processing units capable of executing instructions and performing operations in parallel with each other, commonly referred to as a parallel processing environment.

The computer system 2000 may be a conventional computer, a distributed computer, or any other type of computer, such as one or more external computers made available via a cloud computing architecture. The presently described technology is optionally implemented in software stored on the data stored device(s) 2004, stored on the memory device(s) 2006, and/or communicated via one or more of the ports 2008-710, thereby transforming the computer system 2000 in FIG. 20 to a special purpose machine for implementing the operations described herein.

The one or more data storage devices 2004 may include any non-volatile data storage device capable of storing data generated or employed within the computing system 2000, such as computer executable instructions for performing a computer process, which may include instructions of both application programs and an operating system (OS) that manages the various components of the computing system 2000. The data storage devices 2004 may include, without limitation, magnetic disk drives, optical disk drives, solid state drives (SSDs), flash drives, and the like. The data storage devices 2004 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 2006 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 2004 and/or the memory devices 2006, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 2000 includes one or more ports, such as an input/output (I/O) port 2008 and a communication port 2010, for communicating with other computing, network, or vehicle devices. It will be appreciated that the ports 2008-710 may be combined or separate and that more or fewer ports may be included in the computer system 2000.

The I/O port 2008 may be connected to an I/O device, or other device, by which information is input to or output from the computing system 2000. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 2000 via the I/O port 2008. Similarly, the output devices may convert electrical signals received from computing system 2000 via the I/O port 2008 into signals that may be sensed as output by a human, such as sound, light, and/or touch. The input device may be an alphanumeric input device, including alphanumeric and other keys for communicating information and/or command selections to the processor 2002 via the I/O port 2008.

In one implementation, a communication port 2010 is connected to a network by way of which the computer system 2000 may receive network data useful in executing the methods and systems set out herein as well as transmitting information and network configuration changes determined thereby. Stated differently, the communication port 2010 connects the computer system 2000 to one or more communication interface devices configured to transmit and/or receive information between the computing system 2000 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 2010 to communicate one or more other machines, either directly over a point-to-point communication path, over a wide area network (WAN) (e.g., the Internet), over a local area network (LAN), over a cellular (e.g., third generation (3G) or fourth generation (4G)) network, or over another communication means. Further, the communication port 2010 may communicate with an antenna or other link for electromagnetic signal transmission and/or reception.

In an example implementation, health data, air filtration data, and software and other modules and services may be embodied by instructions stored on the data storage devices 2004 and/or the memory devices 2006 and executed by the processor 2002. The computer system 2000 may be integrated with or otherwise form part of the system shown in FIGS. 1 and 2, for example.

The system set forth in FIG. 20 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

While this disclosure has focused on buck converter embodiments, these methods and circuits are also applicable to boost topologies and other topologies. For instance, while synchronous buck converters have been noted, non-synchronous buck converters could also be used. The primary requirement is that the power conversion stages be able to source and sink power. Although the load has often been described as a plasma load, many other loads can also be implemented. For instance, this disclosure could be used to drive audio speakers or an electrical motor in an electric vehicle.

Figure 24:
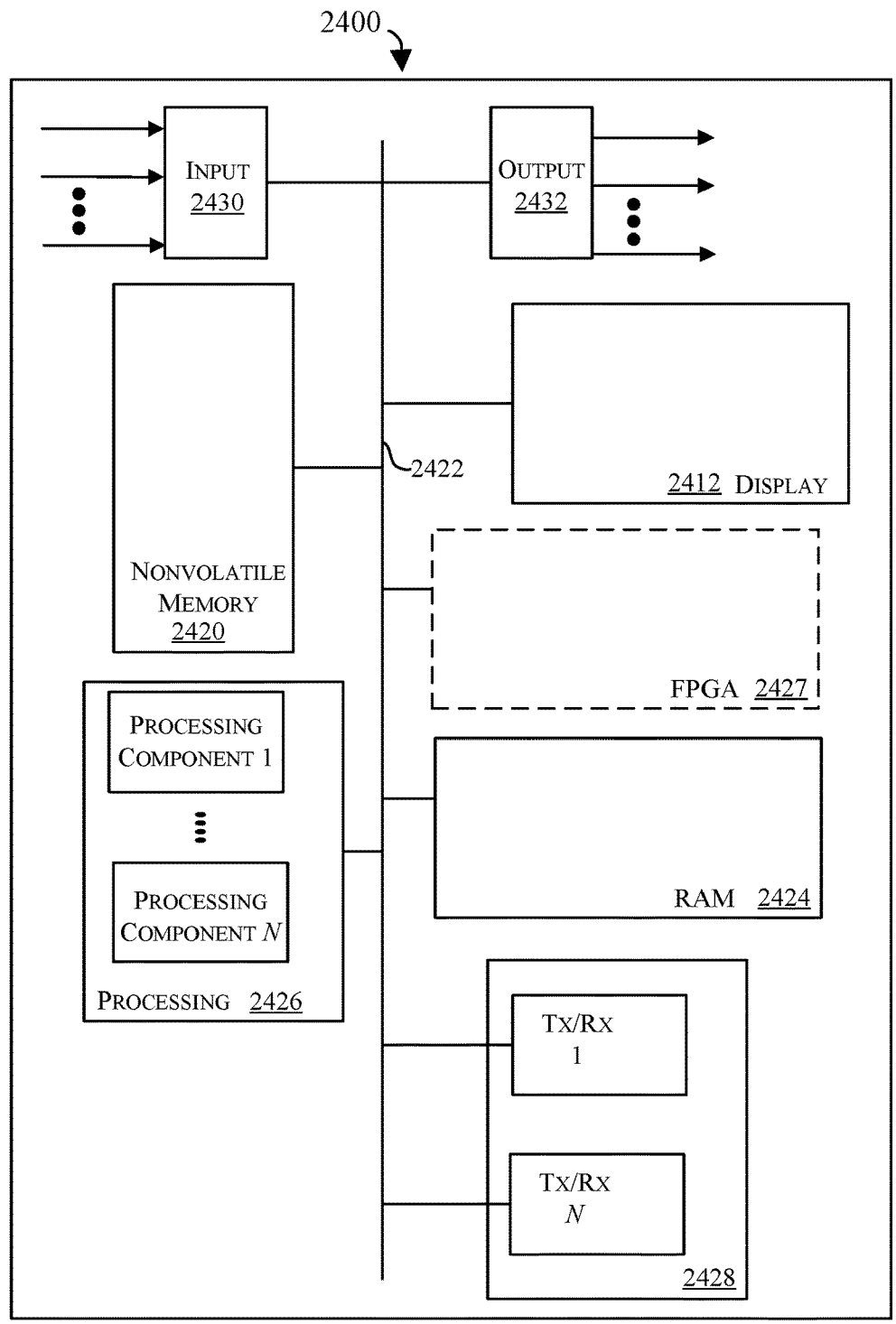
FIG. 24 for example, shown is a block diagram depicting physical components that may be utilized to realize the flash power converter (with or without the controller 301) according to an exemplary embodiment

The methods described in connection with the embodiments disclosed herein may be embodied directly in hardware, in processor-executable code encoded in a non-transitory tangible processor readable storage medium, or in a combination of the two. Referring to FIG. 24 for example, shown is a block diagram depicting physical components that may be utilized to realize the flash power converter (with or without the controller 301) according to an exemplary embodiment. As shown, in this embodiment a display portion 2412 and nonvolatile memory 2420 are coupled to a bus 2422 that is also coupled to random access memory ("RAM") 2424, a processing portion (which includes N processing components) 2426, an optional field programmable gate array (FPGA) 2427, and a transceiver component 2428 that includes N transceivers. Although the components depicted in FIG. 24 represent physical components, FIG. 24 is not intended to be a detailed hardware diagram; thus many of the components depicted in FIG. 24 may be realized by common constructs or distributed among additional physical components. Moreover, it is contemplated that other existing and yet-to-be developed physical components and architectures may be utilized to implement the functional components described with reference to FIG. 24.

This display portion 2412 generally operates to provide a user interface for a user, and in several implementations, the display is realized by a touchscreen display. In general, the nonvolatile memory 2420 is non-transitory memory that functions to store (e.g., persistently store) data and processor-executable code (including executable code that is associated with effectuating the methods described herein). In some embodiments for example, the nonvolatile memory 2420 includes bootloader code, operating system code, file system code, and non-transitory processor-executable code to facilitate the execution of a method described with reference to FIG. 23 described further herein.

In many implementations, the nonvolatile memory 2420 is realized by flash memory (e.g., NAND or ONENAND memory), but it is contemplated that other memory types may be utilized as well. Although it may be possible to execute the code from the nonvolatile memory 2420, the executable code in the nonvolatile memory is typically loaded into RAM 2424 and executed by one or more of the N processing components in the processing portion 2426.

The N processing components in connection with RAM 2424 generally operate to execute the instructions stored in nonvolatile memory 2420 to enable production of a summarized PWM output that is up or downconverted from a dynamic setpoint waveform. For example, non-transitory, processor-executable code to effectuate the methods described with reference to FIG. 23 may be persistently stored in nonvolatile memory 2420 and executed by the N processing components in connection with RAM 2424. As one of ordinarily skill in the art will appreciate, the processing portion 2426 may include a video processor, digital signal processor (DSP), micro-controller, graphics processing unit (GPU), or other hardware processing components or combinations of hardware and software processing components (e.g., an FPGA or an FPGA including digital logic processing portions).

In addition, or in the alternative, the processing portion 2426 may be configured to effectuate one or more aspects of the methodologies described herein (e.g., the method described with reference to FIG. 23). For example, non-transitory processor-readable instructions may be stored in the nonvolatile memory 2420 or in RAM 2424 and when executed on the processing portion 2426, cause the processing portion 2426 to control up or downconversion of a dynamic setpoint waveform with little to no delay in the tracking of the summarized PWM output. Alternatively, non-transitory FPGA-configuration-instructions may be persistently stored in nonvolatile memory 2420 and accessed by the processing portion 2426 (e.g., during boot up) to configure the hardware-configurable portions of the processing portion 2426 to effectuate the functions of the controller 301 or flash power converter 400.

The input component 2430 operates to receive signals (e.g., the reference waveform or the dynamic setpoint waveform) that are indicative of one or more aspects of the controller 301 or flash power converter 400. The output component generally operates to provide one or more analog or digital signals to effectuate an operational aspect of the controller 301 or the flash power converter 400. For example, the output portion 2432 may provide the dynamic setpoint waveform from the setpoint generator, the reference waveform from the reference generator, or the summarized PWM output described with reference to at least FIGS. 4 and 8.

The depicted transceiver component 2428 includes M transceiver chains, which may be used for communicating with external devices via wireless or wireline networks. Each of the M transceiver chains may represent a transceiver associated with a particular communication scheme (e.g., WiFi, Ethernet, Profibus, etc.).

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

As used herein, the recitation of "at least one of A, B and C" is intended to mean "either A, B, C or any combination of A, B and C." The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A flash power converter with an arbitrary output, the flash power converter comprising:
a plurality of N, additive, interleaved pulse-width modulated (PWM) power conversion stages each having an output, and at least a pair of switches within each stage having a fundamental switching frequency, f, where N is a positive integer greater than 1;
a setpoint input configured to receive a dynamic setpoint waveform;
a reference input configured to receive a reference waveform; and
an interconnect topology between the plurality of additive interleaved PWM power conversion stages that connects the outputs of the plurality of additive interleaved PWM power conversion stages into a summarized output,
wherein a current output of each of the plurality of additive PWM power conversion stages is the same,
wherein a voltage at the summarized output is a sum of an output voltage from each of the plurality of additive interleaved PWM power conversion stages,
wherein the summarized output is configured to respond to the dynamic setpoint waveform at a frequency greater than the fundamental switching frequency f to define an output waveform, and
wherein the switches within each stage are driven by a pulse train having a duty cycle representing a ratio of the dynamic setpoint waveform, $V_S$, over a peak-to-peak voltage of the reference waveform, $V_R$, and wherein each pulse train is offset from pulse trains for others of the one or more stages.

2. The flash power converter of claim 1, wherein a smallest offset between any two of the stages is 1/N of the fundamental switching period.

3. The flash power converter of claim 2, wherein the capacitance is sized such that the summarized output has a frequency N times greater than the fundamental switching frequency f.

4. The flash power converter of claim 1, wherein the summarized output is coupled to a plasma load via a filter having a capacitance<40 nF.

5. The flash power converter of claim 1, wherein the summarized output is coupled to a load via a filter having a capacitance sized such that the summarized output has a frequency greater than the Nyquist criteria.

6. The flash power converter of claim 1, wherein the flash power converter does not include a filter between the plurality of additive PWM power conversion stages and a load.

7. The flash power converter of claim 1, wherein the summarized output is coupled to a radio frequency power conversion stage.

8. The flash power converter of claim 1, wherein the dynamic setpoint waveform is configured to receive a non-constant waveform.

9. The flash power converter of claim 1, wherein N>6.

10. The flash power converter of claim 1, wherein the summarized output tracks the dynamic setpoint waveform after only inherent component delays.

11. The flash power converter of claim 1, wherein an output from a pair of switches of a first of the interleaved PWM power conversion stages is coupled to a first switch of a second pair of switches from a second one of the interleaved PWM power conversion stages, and is further coupled to a negative side of a an isolated DC power supply for the second one of the interleaved PWM power conversion stages.

12. The flash power converter of claim 11, wherein a positive side of the isolated DC power supply is coupled to a second switch of the second pair of switches.

13. The flash power converter of claim 12, wherein most, but not all, of the interleaved PWM power conversion stages include a comparator having a first input coupled to the setpoint input and a second input coupled to the reference input via a phase delay component.

14. A flash power converter with an arbitrary output comprising:
a plurality of N, additive pulse-width modulated (PWM) power conversion stages, having inherent component delays and each having a pulse width modulated output, where N is a positive integer greater than 1;
a reference input to the flash power converter;
a dynamic setpoint input to the flash power converter, wherein a ratio of a dynamic setpoint waveform, $V_S$, at the dynamic setpoint input divided by a peak-to-peak voltage of the reference waveform, $V_R$, equals an input voltage ratio, $V_S/V_R$; and an interconnect topology between the plurality of additive PWM power conversion stages, the topology summarizing output voltages or currents from the plurality of additive PWM power conversion stages into a summarized output, said summarized output having a ripple voltage, $V_{RP}$ where the ripple voltage, $V_{RP}$ is a full peak-to-peak output voltage range, $V_T$, divided by N;

said summarized output tracks the dynamic setpoint waveform, $V_S$, wherein said summarized output responds to the dynamic setpoint waveform, $V_S$, such that after the inherent component delays, said summarized output is instantaneously within the ripple voltage, $V_{RP}$ of the input voltage ratio, $V_S/V_R$ times the full output peak-to-peak output voltage range, $V_T$, of said summarized output, and wherein switches within each stage are driven by a pulse train having a duty cycle representing a ratio of the dynamic setpoint waveform, $V_S$, over the peak-to-peak voltage of the reference waveform, $V_R$, and wherein each pulse train is offset from pulse trains for others of the one or more stages.

15. The flash power converter of claim 14, wherein each of the plurality of additive PWM power conversion stages are coupled in series and have equal output currents, and wherein a voltage at the summarized output is a sum of an output voltage from each of the plurality of additive PWM power conversion stages.

16. The flash power converter of claim 14, wherein when the dynamic setpoint waveform jumps by >0.1 V within 0.1 ns, the summarized output tracks this jump within 0.1 ns.

17. The flash power converter of claim 14, further comprising a feedback loop between the summarized output and the dynamic setpoint waveform having a unity gain crossover frequency greater than the fundamental switching frequency f of any one of the plurality of additive PWM power conversion stages or the Nyquist criteria.

18. The flash power converter of claim 14, wherein the summarized output is coupled to a plasma load via a filter, the filter comprising a capacitance<40 nF.

* * * * *